US011877965B2

(12) United States Patent
Mullins et al.

(10) Patent No.: US 11,877,965 B2
(45) Date of Patent: Jan. 23, 2024

(54) CONVERTIBLE MOBILITY DEVICE

(71) Applicant: TRIUMPH MOBILITY, INC., Ottawa (CA)

(72) Inventors: Torrin Mullins, Ottawa (CA); John Tutton, Manotick (CA); Luc Boucher, Ottawa (CA); Robert Watters, Ottawa (CA); David Mackereth, Ottawa (CA)

(73) Assignee: Triumph Mobility, Inc., Ottawa (CA)

( * ) Notice: Subject to any disclaimer, the term of this patent is extended or adjusted under 35 U.S.C. 154(b) by 142 days.

(21) Appl. No.: 17/608,928

(22) PCT Filed: May 7, 2020

(86) PCT No.: PCT/CA2020/050624
§ 371 (c)(1),
(2) Date: Nov. 4, 2021

(87) PCT Pub. No.: WO2020/223819
PCT Pub. Date: Nov. 12, 2020

(65) Prior Publication Data
US 2022/0233375 A1 Jul. 28, 2022

Related U.S. Application Data

(60) Provisional application No. 62/844,981, filed on May 8, 2019.

(51) Int. Cl.
*A61H 3/04* (2006.01)
*A61G 5/08* (2006.01)
(Continued)

(52) U.S. Cl.
CPC .......... *A61G 5/0825* (2016.11); *A61G 5/0883* (2016.11); *A61G 5/101* (2013.01);
(Continued)

(58) Field of Classification Search
CPC .... A61G 5/0825; A61G 5/0883; A61G 5/128; A61G 5/101; A61G 5/1024; A61G 5/08;
(Continued)

(56) References Cited

U.S. PATENT DOCUMENTS 7,108,004 B2 * 9/2006 Cowie ...................... A45B 7/00
135/74
7,451,992 B2 11/2008 Willis
(Continued)

FOREIGN PATENT DOCUMENTS

CA 2845521 A1 9/2014
EP 0759735 B1 3/1997
(Continued)

OTHER PUBLICATIONS

International Search Report and Written Opinion dated Jul. 13, 2020, from PCT/CA2020/050624, 8 sheets.

*Primary Examiner* — James A Shriver, II
*Assistant Examiner* — Hilary L Johns
(74) *Attorney, Agent, or Firm* — Katten Muchin Rosenman LLP

(57) ABSTRACT

The present invention provides an assistive mobility device convertible between a rollator mode and a transport chair mode.

22 Claims, 42 Drawing Sheets

(51) Int. Cl.
*A61G 5/12* (2006.01)
*A61G 5/10* (2006.01)

(52) U.S. Cl.
CPC ........... *A61G 5/1024* (2013.01); *A61G 5/128* (2016.11); *A61H 3/04* (2013.01); *A61H 2003/046* (2013.01); *A61H 2201/1633* (2013.01)

(58) Field of Classification Search
CPC ................ A61H 3/04; A61H 2003/046; A61H 2201/1633
USPC .......................................................... 280/680
See application file for complete search history.

(56) References Cited

U.S. PATENT DOCUMENTS

| | | | | |
|---|---|---|---|---|
| 7,628,411 | B2 | 12/2009 | Meyers et al. | |
| 8,646,804 | B2 * | 2/2014 | Derks | A61G 5/0825 280/87.01 |
| 8,708,363 | B1 * | 4/2014 | Chang | A61H 3/04 280/647 |
| 9,629,763 | B2 * | 4/2017 | Thompson | A61G 5/08 |
| 10,391,018 | B1 * | 8/2019 | Fitzwater | A61H 1/00 |
| 10,752,277 | B2 * | 8/2020 | Haigh | B62B 5/064 |
| 2002/0050697 | A1 * | 5/2002 | Hallgrimsson | A61G 5/0883 280/87.051 |
| 2003/0146601 | A1 * | 8/2003 | Gutierrez | A61H 3/04 280/647 |
| 2005/0211285 | A1 * | 9/2005 | Cowie | A61G 5/0883 135/74 |
| 2009/0206578 | A1 * | 8/2009 | Pizmony | A61H 3/04 280/648 |
| 2010/0301574 | A1 * | 12/2010 | Derks | A61G 5/128 280/47.4 |
| 2012/0256384 | A1 * | 10/2012 | Schaaper | A61H 3/04 280/47.38 |
| 2014/0125037 | A1 * | 5/2014 | Andersen | A61H 3/04 280/47.38 |
| 2015/0250667 | A1 * | 9/2015 | Thompson | A61G 5/08 280/650 |
| 2017/0119616 | A1 * | 5/2017 | Wang | A61H 3/04 |
| 2017/0326019 | A1 | 11/2017 | Bramsiepe et al. | |
| 2019/0105221 | A1 * | 4/2019 | Pan | A61G 5/08 |
| 2020/0008990 | A1 * | 1/2020 | Harrison | B62K 5/025 |
| 2021/0228433 | A1 * | 7/2021 | Landry | A61B 5/1117 |

FOREIGN PATENT DOCUMENTS

| | | | |
|---|---|---|---|
| WO | 9531169 | A1 | 11/1995 |
| WO | 2016010863 | A1 | 1/2016 |
| WO | 2016137322 | A1 | 9/2016 |

* cited by examiner

CONVERTIBLE MOBILITY DEVICE

CROSS REFERENCE TO RELATED APPLICATIONS

This application is the National Stage of International Application No. PCT/CA2020/050624, filed on May 7, 2020, which claims priority of U.S. Provisional Patent Application No. 62/844,981, filed on May 8, 2019, which are hereby incorporated herein by reference in its entirety.

FIELD OF THE INVENTION

The present invention pertains to the field of mobility devices and in particular to devices that are convertible between multiple modes of use.

BACKGROUND

Assistive devices are needed by some people to help maintain their mobility. There a many rollator products that offer a walking user support while moving and some space to carry their belongings, while also functioning as a seat for a user to perch for short periods of time. There are also many transport chairs known in the art that allow a user to be seated while being pushed by a second person. However, while there are a few 2-in-1 products with both rollator and transport functionality, these products all suffer from many shortcomings.

WO 2016/137322 disclosed a rollator-trolley comprising a bracket shaped handle at a rear upper side of the assembly, wherein the bracket shaped handle is pivotally adjustable between a rollator position for use as a walking aid, in which the bracket shaped handle is substantially directed to a front side, and a trolley position for use in carrying goods, in which the bracket shaped handle is substantially directed towards a rear side. This device, however, is not suitable for use in transporting a user in a transport chair mode.

US 2017/0326019 disclosed a mobile walking and transport aid device for supporting particularly persons with impaired walking ability having lateral supports that can be swiveled about a horizontal axis from a first, backwardly tilted position into a at least one forwardly tilted position, the backwardly tilted position being suitable for pushing the walking and transport aid device and/or for supporting the user while walking and/or for the user to sit on the walking and transport aid device, and the at least one forwardly tilted position begin suitable for pulling the walking and transport aid device from the front. This device, however, is not suitable for use in transporting the person with impaired walking ability in a transport chair mode.

U.S. Pat. No. 7,628,411 B2 disclosed a walker device for assisting an individual with mobility which is temporarily convertible to a wheeled transportation chair. A backrest is selectively disposed in a front position for a rearward seating condition or in a rear position for a forward seating condition. This device, however, requires removal and replacement to convert between the rollator configuration and the wheeled transportation configuration.

EP 0759735 B1 disclosed a combination wheelchair and walker for handicapped or elderly persons walking with a difficulty, the chair having wheels and/or hand grips that may be mounted in first and second alternative positions, wherein in the first position the chair may be pushed by and support a walking or standing handicapped person, and in the second position the chair may be used for transporting a sitting handicapped person and the chair may be pushed by an assisting person. To facilitate conversion between the two modes, this device requires the tilting, rotating or folding of the chair seat.

US 2002/0050697 disclosed a wheeled walker convertible to a transport chair having a strap-type backrest that is pivotally attached to the upper end of the handlebars. The backrest can be placed in a forward position when the apparatus is used as a walker and the user wishes to rest in a rearward facing sitting position and in a rearward position when the apparatus is used as a transport chair and the user sits in a forward facing position and is propelled by a care-giver. The strap-type backrest of this device, however, has a limited ability to provide comfortable support to the user in both rollator and wheeled transportation configurations. In addition, the handles are fixed with a preference to the rollator mode, which means that the assisting user will be very close to the seated user, which can make it difficult to maneuver a seated person up a curb since the handles are not behind the rear wheel.

Therefore there is a need for a mobility device that offers both transport and rollator functionality with easy transition between the two modes without requiring the removal or installation of additional components or the use of tools to effect the conversion.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a convertible mobility device. In accordance with an aspect of the present invention, there is provided an assistive mobility device convertible between a rollator mode and a transport chair mode, the device comprising: two laterally spaced apart side frame structures, each side frame structure comprising: a rear handle support member having a top handle end and a bottom end, a front armrest member having a top armrest end and a bottom end, a wheel rail member connected to the handle support member, and a seat rail member extending substantially horizontally and connected to at least one of the handle support member and the front armrest member. The mobility device also comprises a seat bottom extending between the two side frame structures and attached to a respective seat rail; a cross brace assembly extending between the two side frame structures; a seat back member extending between and attached to each of the side frame structures, the seat back member being convertible between a first rollator mode and a second transport chair mode; a handle assembly located at the top handle end of each handle support member, two rear wheels, each of the rear wheels being mounted at the rearward end of a respective side frame structure; and two front wheels, each of the front wheels being mounted at the front end of a respective side frame structure.

DETAILED DESCRIPTION OF THE INVENTION

The term "rollator" is used to describe a walking frame equipped with wheels for users with mobility problems, preferably with a seating capability.

The expression "rollator mode" refers to the configuration of the device suitable for providing support to a user while walking, while also functioning as a seat for a user to sit or perch for short periods of time.

The expressions "transport chair mode" and "transport mode" each refer to the configuration of the device suitable for the user to be seated while being pushed by another person.

The expressions "mode change" and "modal change" each refer to the conversion between transport chair mode and rollator mode, or vice versa.

The expressions "deployed state" and "use state" each refer to the configuration of the device when unfolded and suitable for use in either rollator or transport chair mode.

The expressions "collapsed state" and "storage state" each refer to the configuration of the device when folded, for example, if the device needs to be stored or put into a trunk, or if a user needs to get through a narrow doorway.

The expression "state change" refers to the conversion of the device from the deployed (or use) state, to the collapsed (or storage) state.

Unless defined otherwise, all technical and scientific terms used herein have the same meaning as commonly understood by one of ordinary skill in the art to which this invention belongs.

The present invention therefore provides a mobility device that offers both transport and rollator functionalities with easy transition between the two modes. The assistive mobility device of the present invention is provided with all components required to effect this modal change into the alternate modes without requiring the removal or installation of additional components or the use of tools to effect the conversion.

The present invention therefore provides an assistive mobility device that is easily and readily convertible between a rollator mode and a transport chair mode.

In a preferred embodiment, the mobility device is also convertible between a deployed state suitable for use, and a collapsed, or folded, state for storage.

Figure 1A:
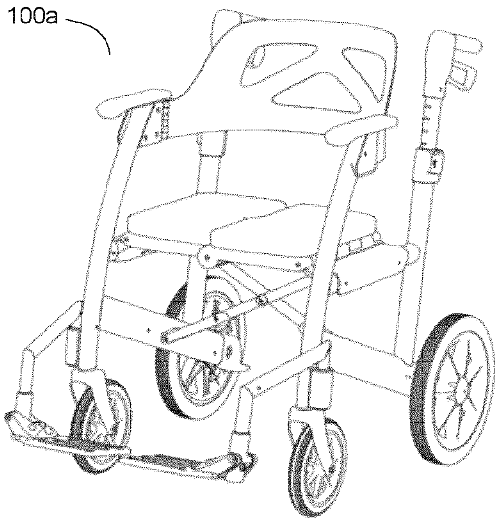
FIG. 1A illustrates a perspective view of a mobility device in accordance with one embodiment of the invention.
Figure 1B:
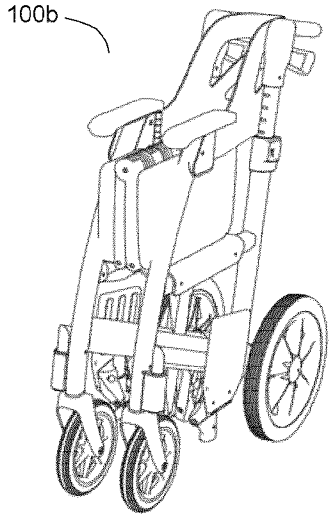
FIG. 1B illustrates a perspective view of a mobility device in accordance with one embodiment of the invention.

An exemplary mobility device in transport mode is depicted in its deployed state 100*a* in FIG. 1A, and in its storage state 100*b* in FIG. 1B.

Figure 2A:
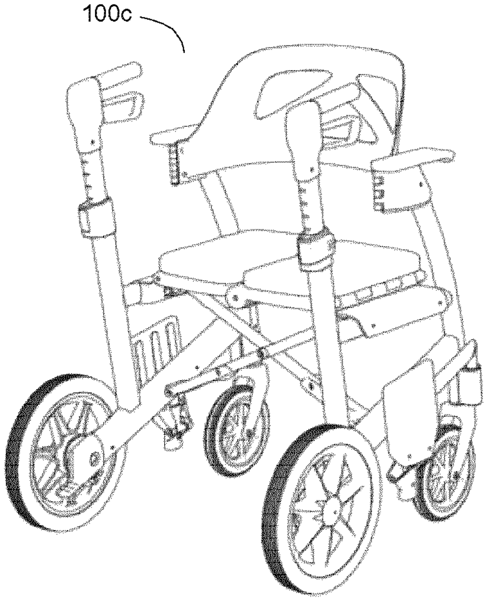
FIG. 2A illustrates a perspective view of a mobility device in accordance with one embodiment of the invention.
Figure 2B:
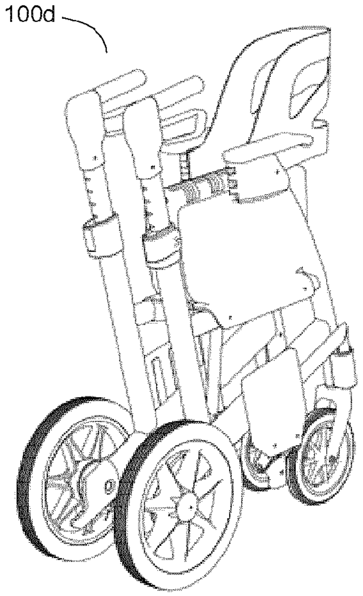
FIG. 2B illustrates a perspective view of a mobility device in accordance with one embodiment of the invention.

An exemplary mobility device in rollator mode is depicted in its deployed state 100*c* in FIG. 2A, and in its storage state 100*d* in FIG. 2B.

In accordance with the present invention, the mobility device comprises two laterally spaced apart side frame structures, each side frame structure being formed from a rear handle support member, a front armrest member, a wheel rail member connected to the handle support member, and a horizontal seat rail member upon which the seat bottom is located, connected to at least one of the handle support member and the front armrest member.

The mobility device also includes a seat back member that is convertible between a first rollator mode and a second transport chair mode, the seat back member extending between and attached to each of the side frame structures. In one embodiment the seat back is connected to the front armrest member. In one embodiment, the seat back is connected to the handle support member.

In one embodiment, the side frame structure further comprises an upper rail member extending between the front armrest member and the handle support member near their respective upper ends to further stiffen the side frame.

The mobility device is conveyed on four wheels, including two rear wheels mounted at the rearward end and two front wheels mounted at the front end of respective side frame structures. In a preferred embodiment, the rear wheels are larger than the front wheels.

In one embodiment, each of the front wheels is mounted at the bottom end of a respective front armrest member. In a preferred embodiment, each of the front wheels is pivotably mounted to the front armrest member.

In one embodiment, each of the rear wheels is mounted at the rearward end of a respective wheel rail member.

Figure 5A:
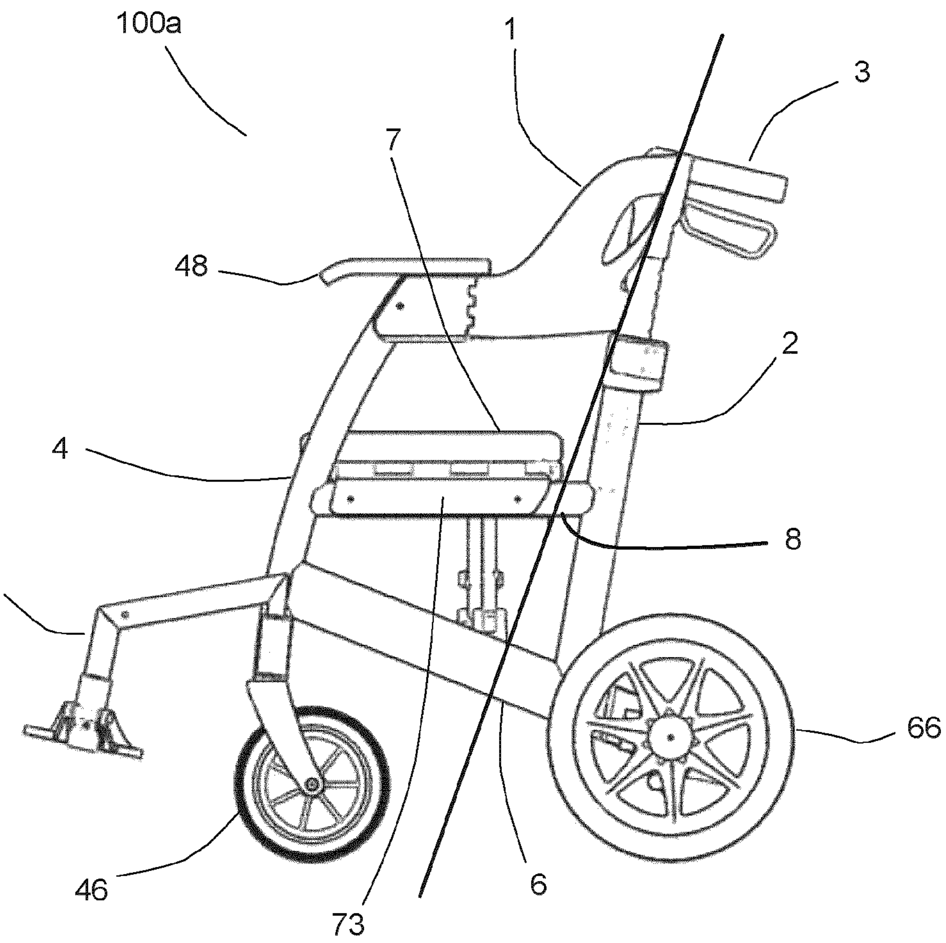
FIG. 5A illustrates a side view of a mobility device in accordance with one embodiment of the invention, in which the handle support member that is closest to the viewer has been removed to show the rear of the seat.
Figure 5B:
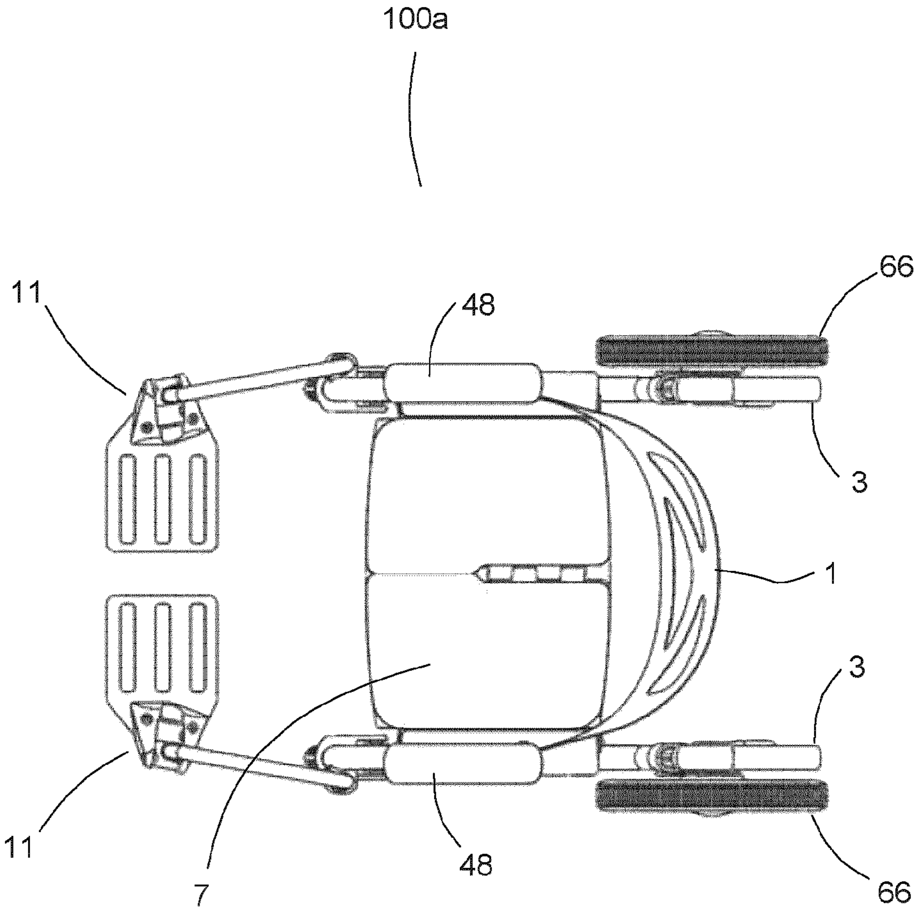
FIG. 5B illustrates a top view of a mobility device in accordance with one embodiment of the invention.

An exemplary mobility device in transporter mode is shown in FIG. 5A (side view) and FIG. 5B (top view). All elements of the side frame structure, including handle support member 2, front armrest member 4, wheel rail member 6, and seat rail member 8, are shown. Also shown is seat bottom member 7, front wheels 46 and rear wheels 66. Handle assembly 3 and seat back member 1 are shown in the transport mode configurations. Foot rest member 11 is shown in the deployed position.

Figure 6A:
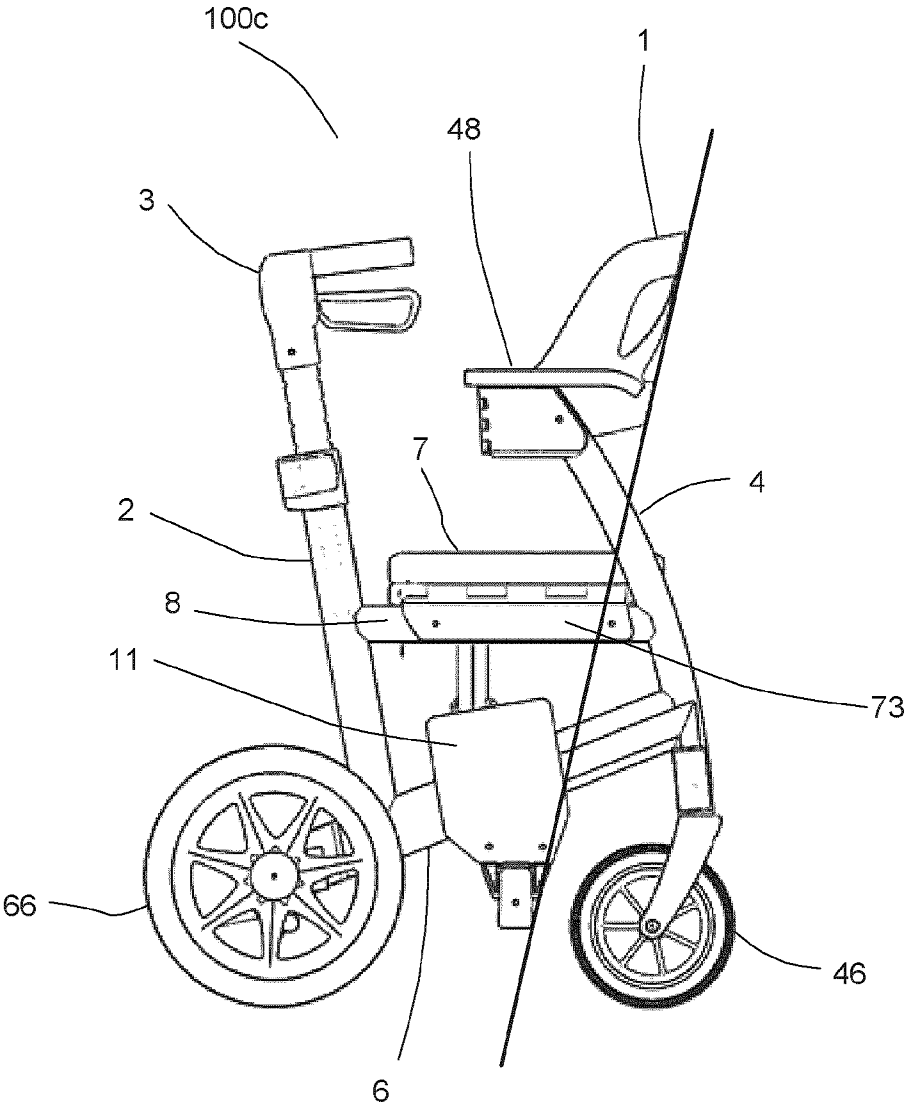
FIG. 6A illustrates a side view of a mobility device in accordance with one embodiment of the invention.
Figure 6B:
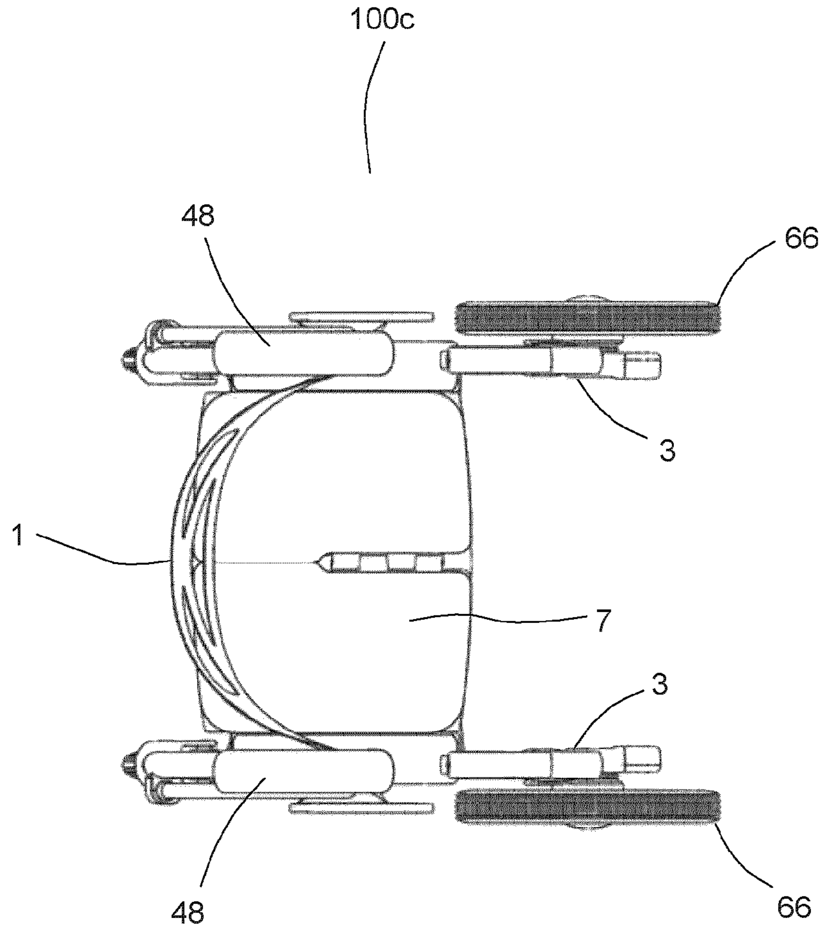
FIG. 6B illustrates a top view of a mobility device in accordance with one embodiment of the invention.

An exemplary mobility device in rollator mode is shown in FIG. 6A (side view) and FIG. 6B (top view). All elements of the side frame structure, including handle support member 2, front armrest member 4, wheel rail member 6, and seat rail member 8, are shown. Also shown is seat bottom member 7, front wheels 46 and rear wheels 66. Handle assembly 3 and seat back member 1 are shown in the rollator mode configurations. Foot rest member 11 is shown in the storage position.

Seat Back

In a preferred embodiment, the seat back member is formed of a flexible material to facilitate the transition between modes, while also providing comfort in use by conforming to the user's back while also providing some side support while in the sitting position. Thus, in this embodiment, the central portion of the seat back and its two sides are integrated in a single piece of flexible material.

The seat back member can be cut out from a sheet of flexible material with the post processing addition of features such as window cut outs, calendared flex area, and holes for mounting to the hinge mechanism. Alternatively, the seat back can be formed with all such features present by injection molding or casting a suitable polymer that can allow for reliable performance within the range of extreme seasonal temperatures, while also allowing for the demanding flexing requirement for mode transition. Suitable polymer types include, but are not limited to, high-density polyethylene (HDPE), low-density polyethylene (LDPE), thermoplastic polyurethane (TPU), Nylon, or other polymers suitable to the requirements. Thermoset polyurethane can be cast and can allow for favorable changes in wall thickness suitable to the different functional areas of the seat back.

In one embodiment, the seat back member is provided with a cushioned outer surface formed by overmolding a low density compressive material over the main flexible seat back member, to offer improved comfort to the user when in contact with the seat back. Other soft or cushioning material fabrics, coverings and/or foams, able to withstand the mode transition, may also be used. In one embodiment, the overmolded or cushioning material is provided on both sides of the seat back. In another embodiment, the overmolded or cushioning material is provided on one side of the seat back. In such an embodiment, the overmolded or cushioning material is preferably provided on the side that is in contact with the user when in transport chair mode. In one embodiment, the overmolded or cushioning material is provided as a continuous layer on the seat back. In another embodiment, the overmolded or cushioning material is provided as a discontinuous layer, to provide localized islands or pillows of cushioning on the seat back.

In accordance with the present invention, the seat back member does not require removal or the use of tools to facilitate the transition between a first rollator mode to a second transport chair mode.

In one embodiment, the seat back member is mounted to each of the front armrest members through a hinging mechanism. In this embodiment, one hinge is located at the end of each of the seat back's sides, each hinge allowing for about 180 degrees of motion in order to transition the seat back from the rollator mode to the transport chair mode. The use of the hinging mechanism allows the seat back member to transition between modes without requiring removal during the transition process.

In one embodiment, the seat back is removably attached to allow for a reduced height to the device that may be desirable during shipping. In one embodiment, the seat back connection and disconnection process requires the use of tools. In a preferred embodiment, the seat back connection and disconnection process employs releasable connection mechanisms that require no tools.

Figure 7:
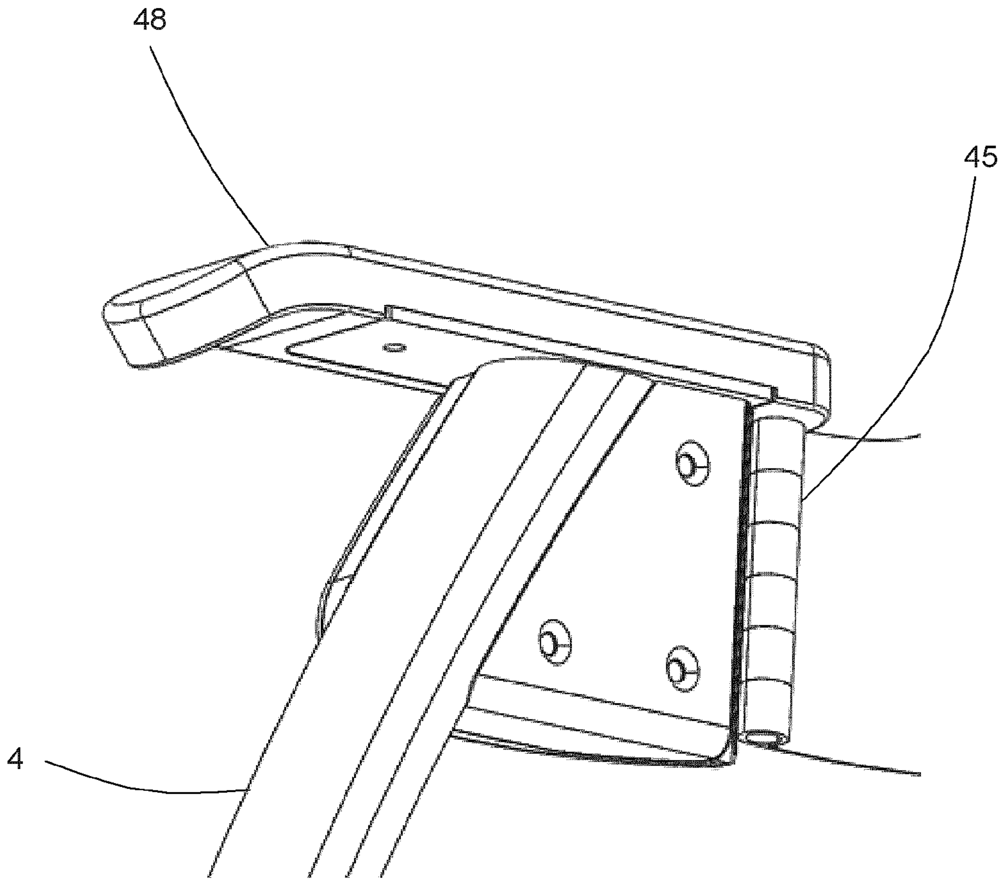
FIG. 7 illustrates a bottom perspective view of a seat back hinge mechanism for use with a mobility device in accordance with one embodiment of the invention.

In the embodiment depicted in FIG. 7, hinge mechanism 45 is mounted on front armrest member 4. In this embodiment, the two hinges are provided in approximate vertical orientation to facilitate the transition of the seat back member between rollator and transport modes. Also shown is armrest 48.

In one embodiment, the hinge comprises a metal bracket and the portion of the hinge extending to the right of the image can further include any suitable mechanism to connect to the seat back. In one embodiment, the hinge is configured to support the seat back at the connection point as well as fastening features. In one embodiment, the seat back can be formed with integral hinge features for connecting to the hinge bracket part mounted to the armrest upright.

Figure 30:
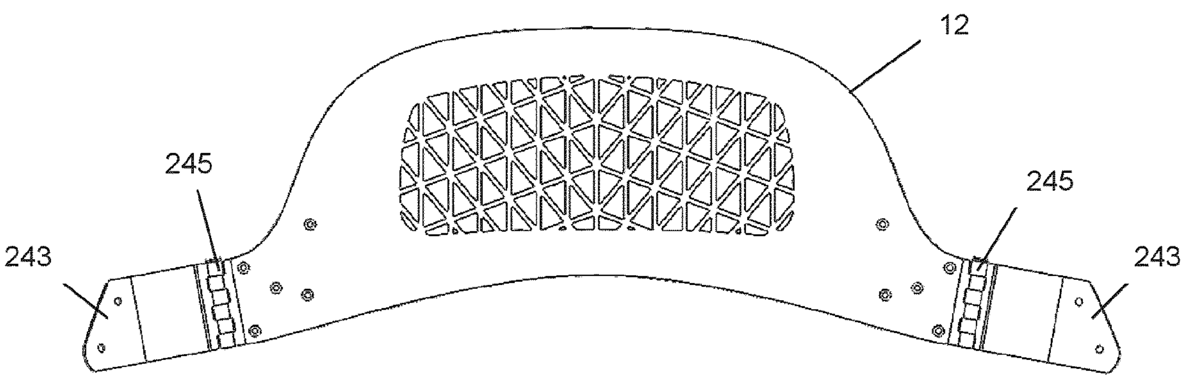
FIGS. 30 and 31 illustrate a seat back member for use with a mobility device in accordance with one embodiment of the invention.
Figure 31:
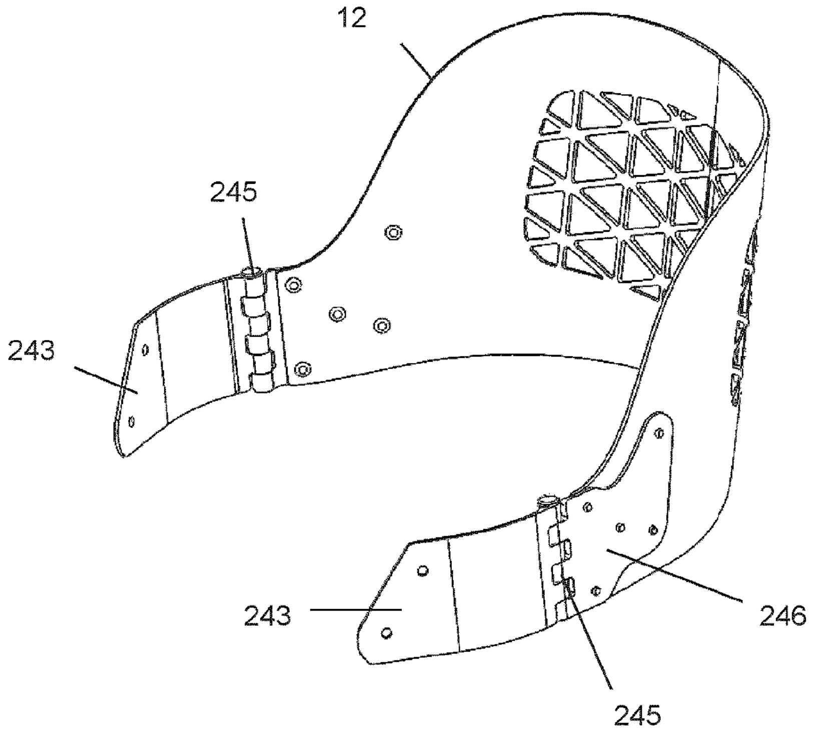
Figure 32:
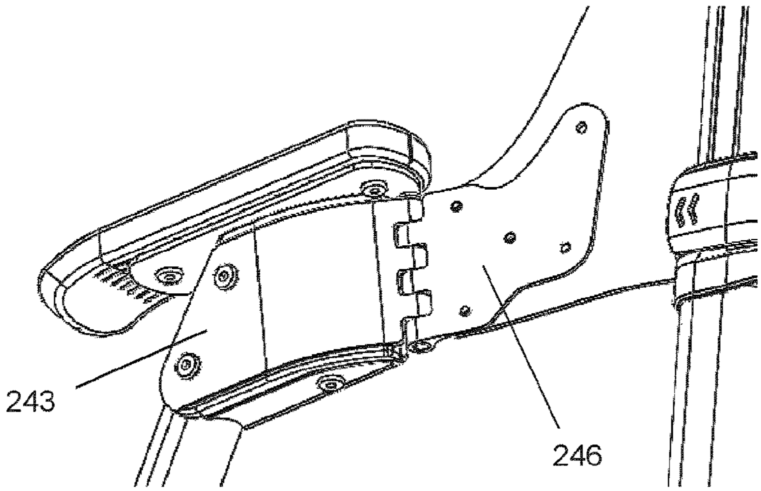
FIG. 32 illustrates a bottom perspective view of a seat back hinge mechanism for use with a mobility device in accordance with one embodiment of the invention.
Figure 33:
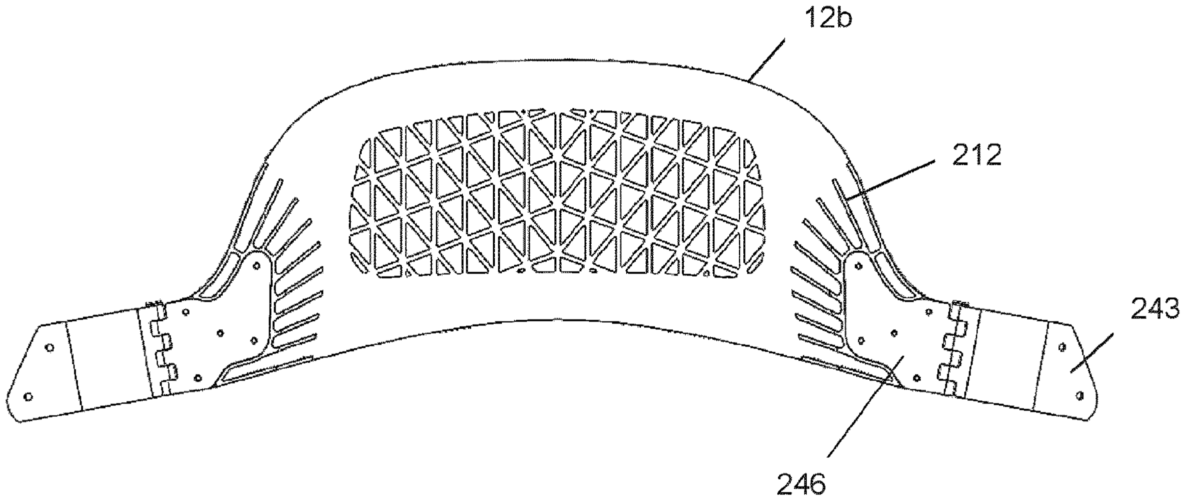
FIG. 33 illustrates a seat back member for use with a mobility device in accordance with one embodiment of the invention.
Figure 34:
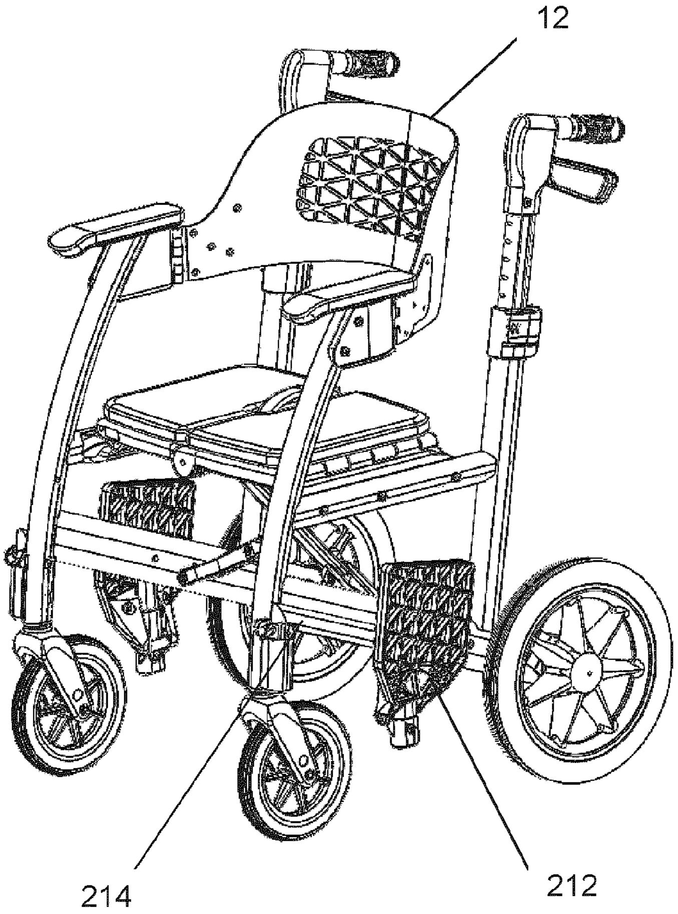
FIG. 34 illustrates a perspective view of a mobility device in accordance with one embodiment of the invention, incorporating the seat back member depicted in FIGS. 30, 31 and 33.

FIGS. 30, 31 and 33 depict one embodiment of a seat back member 12 for use in the present invention, including hinge 245 and hinge bracket 246. In this embodiment, hinge bracket 246 is associated with and integral to hinge 245 (which is attached to armrest member 4 via hinge tab 243), and is configured to provide a more robust connection to the seat back member, while also stiffening the area of the seat back adjacent to the hinge bracket. Use of the hinge bracket provides protection against damage to the seat back that can occur due to repeated impacts sustained during normal use.

Hinge 245 and hinge bracket 246 can each be formed from any suitable material that can withstand the forces applied during manipulation of the seat back between rollator and transport modes, as well as in general use. Such materials can be, but are not limited to, metal (steel, aluminum, or stainless) or polymers (including engineering grade, impact modified, filled, glass filled, UV stabilized, or other appropriate additives).

Hinge bracket 246 can be attached to the seat back material by any suitable mechanism, including but not limited to, adhesive, rivets, overmolding of the seat back onto the hinge bracket, melt/weld assembly, snap rivets, threaded mechanical fastener hardware, and the like.

Figure 38:
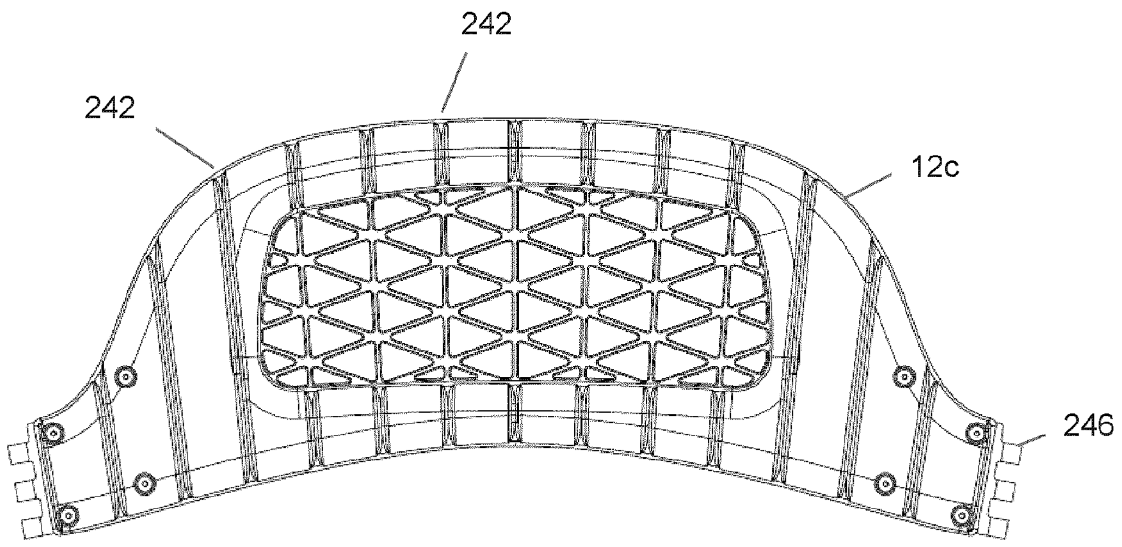
FIG. 38 illustrates a seat back member for use with a mobility device in accordance with one embodiment of the invention.
Figure 39:
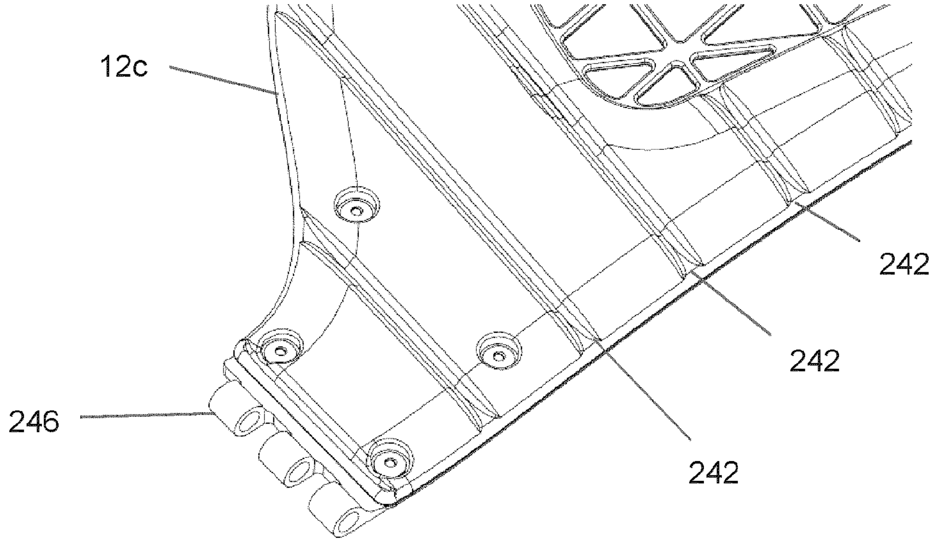
FIG. 39 illustrates a partial perspective view of a hinge region of the seat back member depicted in FIG. 38.

FIGS. 38 and 39 depict one embodiment of seat back member 12*c* which has been formed with an overmolded outer surface. In this embodiment, hinge bracket 246 is sandwiched between layers of soft overmolded material. This embodiment provides the benefit of increased user comfort through contact with the soft overmold material during use.

Figure 40A:
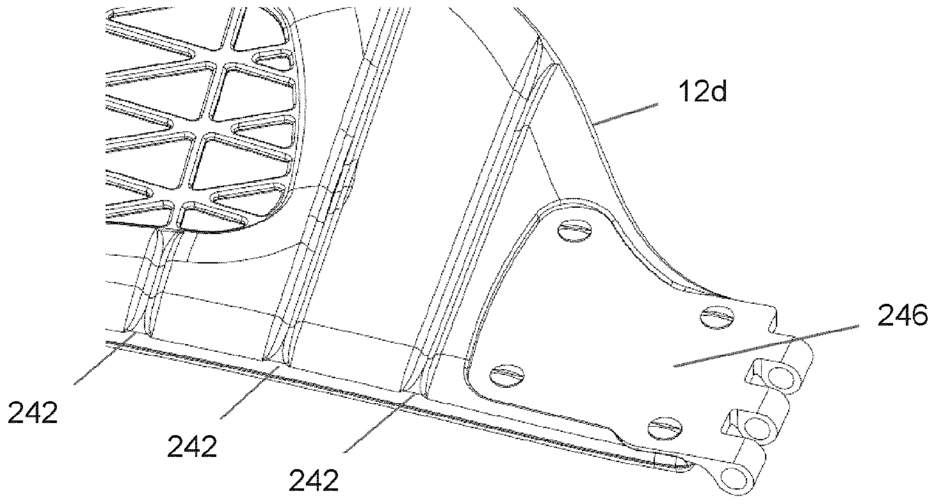
FIG. 40A illustrates a partial perspective view of a hinge region of a seat back member, including hinge bracket, for use with a mobility device in accordance with one embodiment of the invention.
Figure 40B:
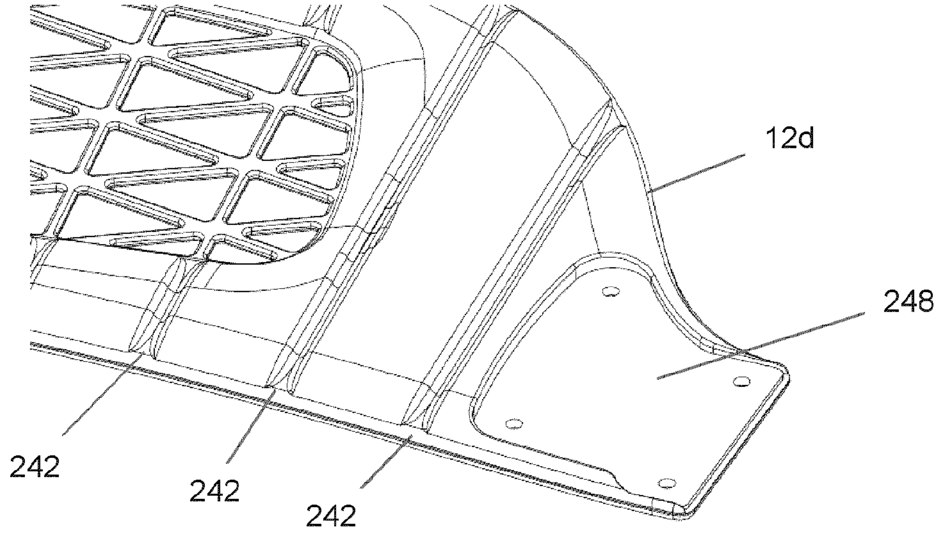
FIG. 40B illustrates a partial perspective view of a hinge region of a seat back member for use with a mobility device in accordance with one embodiment of the invention.

FIGS. 40A-B depict one embodiment of seat back member 12*d* which has also been formed with an overmolded outer surface, but which has been provided with hinge allowance 248 in the overmold material, sized to accommodate hinge bracket 246. This embodiment allows for easy disassembly of the seat back member, for example, to replace the hinge member.

FIGS. 38, 39 and 40A-B also depict seat back members covered with overmolded materials formed with a plurality of crease zones 242 formed as vertical grooves in the overmold material. The use of crease zones provides a seat back member having increased flexibility for ease of transition between modes by providing 'allowances' for the flexing of the seat during the transition.

In one embodiment, each of the crease zones is located equidistant from each other. In one embodiment, the distance between adjacent crease zones is not equal. In one such embodiment, the distance between crease zone decreases as the sides of the seat back is approached. In one embodiment, the creases are provided as areas of discontinuity in the overmolded materials.

FIG. 33 depicts a seat back member 12*b* provided with integrally molded force distribution features 212. In one embodiment, seat back member 12*b* may be provided with an overmolded outer surface that covers the force distribution features, partially or fully.

It is within the scope of the present invention that the seat back member can be attached to any upright member of the side frame structure, either directly or through the use of suitable mounting brackets, for example, a mounting bracket that extends from the handle receiving tube.

In one embodiment, two different seat back depths are provided through the non-centered location of the seat back hinge relative the seat bottom. This is depicted in FIGS. 5B and 6B, which show a deeper seat depth in the transport configuration relative to the seat depth of the rollator configuration, which provides additional stability and security for the seated passenger in a mobility device in the transport configuration.

The seat back member can have any suitable shape or size, including a full height seat back that provides full back support for the user.

In a preferred embodiment, the seat back is configured to have a backwardly sloped recline to provide a desired backrest angle for comfortable seating in both modes. In one embodiment, the hinges are mounted in a slightly off-vertical orientation, thus allowing the seat back to be in a slightly more reclined position in the transport mode relative to the rollator mode. This difference in seat back slope is apparent in FIG. 5A (transport mode) and FIG. 6A (rollator mode).

The seat back member is optionally provided with one or more cut through openings to allow a user to "see through" the seat back when in rollator mode, thus ensuring visibility of items located in the path of the rolling device.

In some embodiments, the seat back has features that can be used to collapse the seat back, for example longitudinal flex lines, and associated retention features to retain the seat back in the collapsed state, thereby reducing its height/surface area to improve the user's view or the approaching terrain.

In another embodiment, the seat back is made from three main components in addition to the described hinge mechanism, including two lateral side walls that are hingeably or flexibly connected to a seat back wherein these elements can still be pushed through to transition between modes.

In one embodiment, the seat back can be provided with the polymer in direct contact with the user. In one embodiment, the seat back can be provided within a fabric sleeve or with a padded cover. In one embodiment, the seat back can be provided with padded surfaces on both of its sides. In such an embodiment, a differential amount of padding can be applied such that there is additional padding appropriate to the transport mode side of the seat back. In one embodiment, the padding is laminated to the substrate. In one embodiment, the padding is formed of padded elements that are then connected to the polymer.

In one embodiment, the seat back is made from a clear or translucent material to assist with the user's ability to see through the seat back.

In one embodiment, the seat back of the mobility device can be transitioned between modes using a push-through process in which the user grips the seat back and pulls or pushes it through to the other side to transition between modes. The spring force of the flexible material results in an "over-center" mechanical layout where the seat is stable in either end condition (i.e., in rollator mode or transport chair mode), but is unstable during the transitional mid-positions, thus providing the user with the feeling that the seat is mechanically assisting the transition.

In one embodiment, an action point may be included on the seat back to guide the user in transitioning the seat back from a first rollator mode to a second transport chair mode. For example, an action point can be provided as a handle feature to assist the user in gripping the seat back, or a grip point to indicate to the user the location of the optimal grasp point. In one embodiment, the action point is not centrally located since it may be easier for some users to move one side of the seat through at a time rather than from the center, as pulling the seat back from a point that is off center allows the seat back to pass through in an 'S' shape, with one side following the other.

Handle Assembly

In accordance with the present invention, the mobility device comprises a handle assembly located at the top handle end of each handle support member, to be gripped by the user of the device during use.

In accordance with the present invention, the handle assembly can be converted between a rollator configuration and a transport configuration. The handle assembly in the rollator configuration is directed toward the front of the device, and forward of the rear wheels, to facilitate control of the device by the person using the device as a walking support, such that a user applied force onto the handles does not encourage the device to tip backwards about the rear wheels with the handle in the forward positon. The handle assembly in the transport configuration is directed toward the rear of the device to facilitate control of the device by the person pushing the mobility device.

In one embodiment, the handle support member comprises a handle receiving tube, and a rotatable and extendible handle extension shaft inserted into the handle receiving tube. In such an embodiment, the handle assembly is preferably mounted on the handle extension shaft.

In a preferred embodiment, the handle support member is adjustable in length by extending the handle extension shaft in the handle receiving tube. In such an embodiment, the handle support member is provided with a height adjust and locking assembly to maintain the handle extension shaft at the desired height within the handle receiving tube. In one embodiment, this locking function is provided using a height adjust lock lever.

Figure 3:
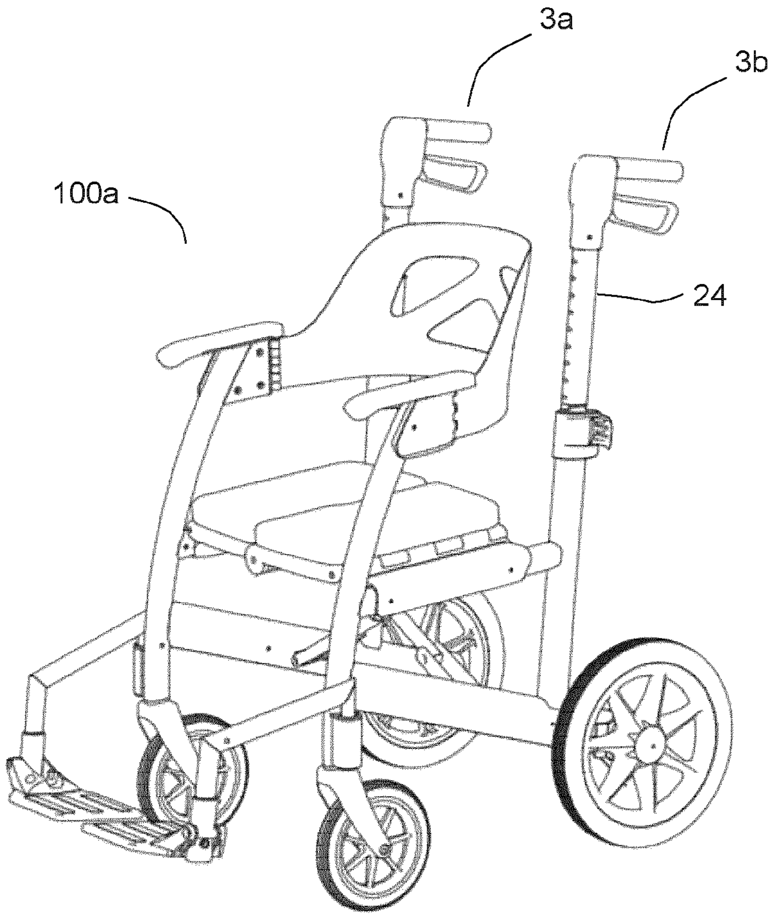
FIG. 3 illustrates a perspective view of a mobility device in accordance with one embodiment of the invention.

FIG. 3 depicts the mobility device in a transport mode with handle extension shaft 24 fully extended and with both handle assemblies 3*a,b* in the transport configuration.

Figure 4:
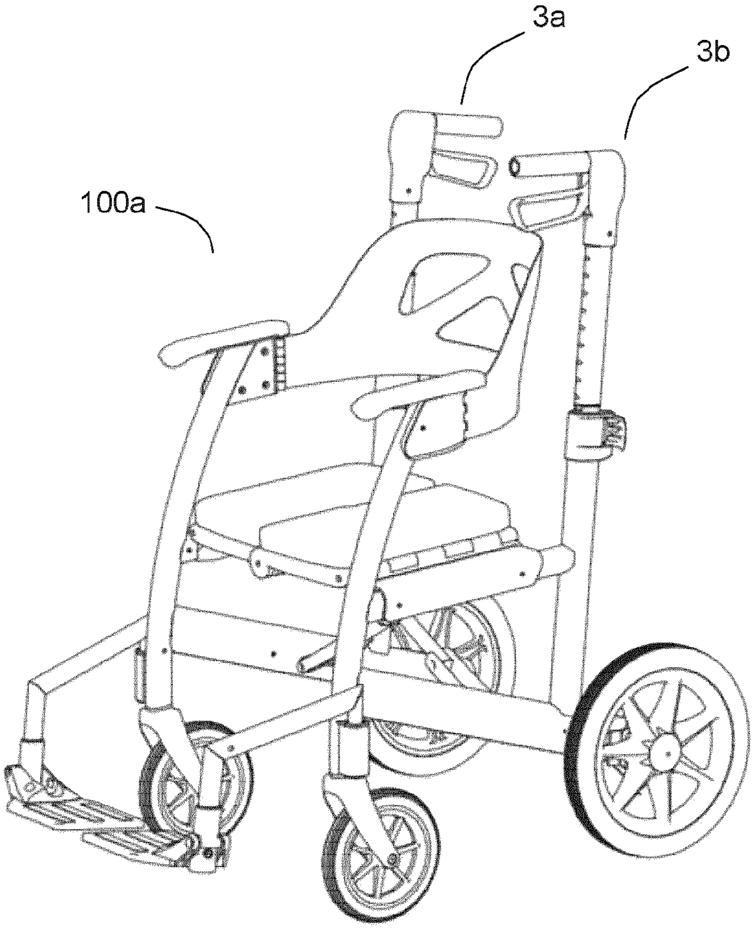
FIG. 4 illustrates a perspective view of a mobility device in accordance with one embodiment of the invention.

FIG. 4 depicts the mobility device in a transport mode with the handle extension shaft 24 fully extended and with one handle assembly in the transport configuration 3*a* and the other in rollator configuration 3*b* (for illustration purposes only).

Figure 9:
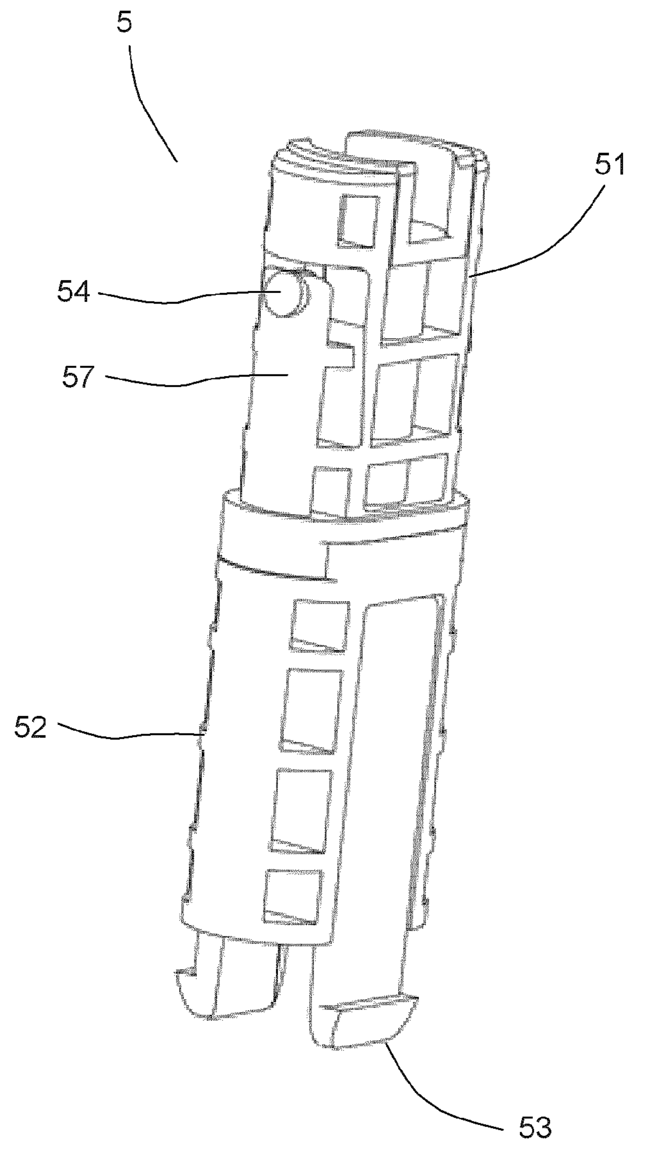
FIG. 9 illustrates a perspective view of the top and bottom joint components of a handle rotation mechanism, for use with a mobility device in accordance with one embodiment of the invention.

One embodiment of a handle rotation mechanism is depicted in FIG. 9. In accordance with this embodiment, the handle rotation mechanism is a pivot joint 5 comprising top pivot joint 51 and bottom pivot joint 52, wherein the top joint is rotatable relative to the bottom joint and the bottom joint remains in a fixed position within the handle receiving tube. Also shown is bottom joint retainer 53, which prevents the pivot joint from being pulled out of the handle receiving tube. The top pivot joint 51 is provided with flex member 57 with integral button 54 to lock/retain the top joint in the respective tube.

Figure 10A:
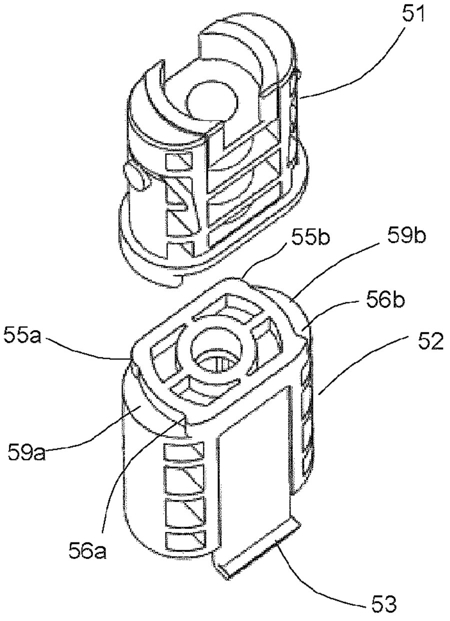
FIG. 10A illustrates a top exploded view of the top and bottom joint components of a handle rotation mechanism for use with a mobility device in accordance with one embodiment of the invention.
Figure 10B:
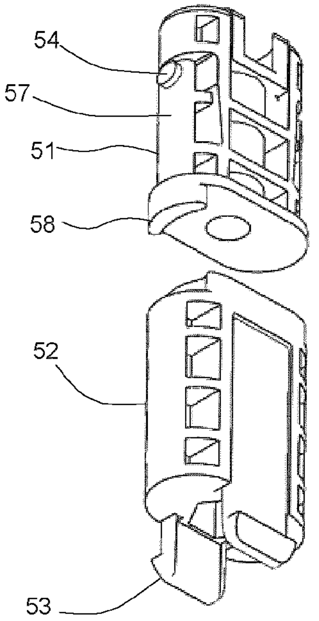
FIG. 10B illustrates a bottom exploded view of the top and bottom joint components of a handle rotation mechanism for use with a mobility device in accordance with one embodiment of the invention.

FIGS. 10A and 10B depict exploded views of the top and bottom joints, showing the cooperative elements that limit the motion of the top and bottom joints relative to each other in moving between rollator and transport modes.

This embodiment employs the frictional interaction of elements on the top pivot joint with elements on the bottom joint to control movement from a first rest zone on the bottom joint defining a first mode to a second rest zone on the bottom joint defining a second mode.

As depicted in FIGS. 10A and 10B, striking protrusion 58 on top pivot joint 51 is configured to frictionally engage with cam lobes 55*a,b* located on bottom pivot joint 52 to prevent free rotation of the top pivot joint between modes. Also provided on bottom pivot joint 52 are stop features 56*a,b* that limit the top joint to 180 degree rotation. When top joint 51 is rotated to either of the first and second modes, the user can reinsert handle support 24 into the receiving tube 23.

Figure 11A:
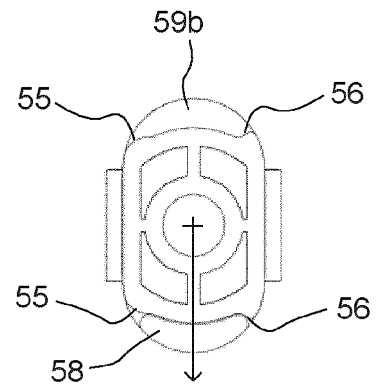
FIGS. 11A-C illustrate cross sectional views of the top and bottom joint of a handle rotation mechanism in transport chair mode, between transport chair and rollator modes, and in rollator mode, respectively.
Figure 11B:
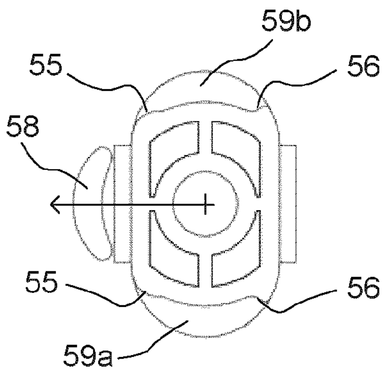
Figure 11C:
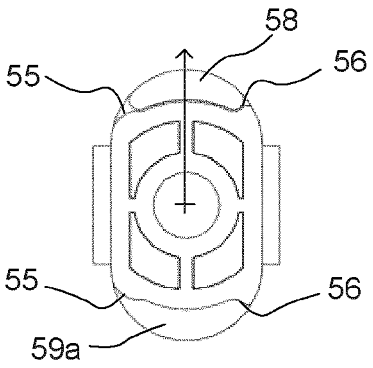

FIGS. 11A-C further depict a cross sectional view of the pivot joint assembly in transport mode (FIG. 11A), between transport chair and rollator modes (FIG. 11B), and in rollator mode (FIG. 11C).

FIGS. 18, 19A-B, and 20A-C depict an alternative embodiment of a pivot joint suitable for use in the present invention.

In accordance with this embodiment, the handle rotation mechanism is a pivot joint 15 comprising top pivot joint 151 and bottom pivot joint 152, wherein the top joint is rotatable relative to the bottom joint and the bottom joint remains in a fixed position within the handle receiving tube. Also shown is bottom joint retainer 153, which prevents the pivot joint from being pulled out of the handle receiving tube. The joint retainer 153 can collapse into the bottom pivot joint 152 when the handle shaft is in the lowest position and with less room taken because of its collapsed state, more length/height extension in the handle shaft can be provided. The top pivot joint 151 is provided with flex member 157 with integral button 154 to lock/retain the top joint in the respective tube.

Figure 19A:
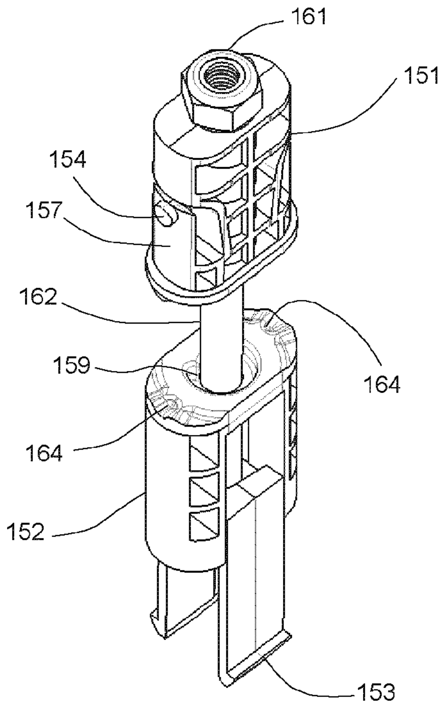
FIG. 19A illustrates a top exploded view of the top and bottom joint components of a handle rotation mechanism for use with a mobility device in accordance with one embodiment of the invention.
Figure 19B:
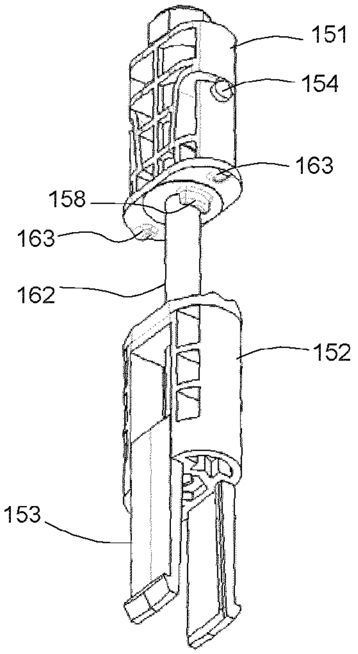
FIG. 19B illustrates a bottom exploded view of the top and bottom joint components of a handle rotation mechanism for use with a mobility device in accordance with one embodiment of the invention.

As depicted in FIGS. 19A and 19B, top joint is provided with protrusion element 158 that extends into receiving channel 159 on bottom joint 152. Receiving channel 159 is shaped to limit top joint rotation through 180 degrees, between a first mode and a second mode. Top joint 151 pulls away from bottom joint 152 as a result of the ramped shapes of detent tabs 163 and detent grooves 164 that drive a vertical motion from the user applied rotational motion, to provide enough separation between joints to enable rotation of the top joint about rotation bolt 162. Compression spring 160, held in place by nut 161, is provided to bias top joint 151 into contact with bottom joint 152, while also allowing for separation between the two joints. When top joint 151 is rotated to either of the first and second modes, the user can reinsert handle support 24 into the receiving tube 23. Also shown are detent tabs 163, which situate within respective detent grooves 164 when the top joint is in either of the first and second modes. The compression spring 160 captured within the nut and bolt, holds top joint 151 and bottom joint 152 together, but the ramping function overcomes the spring, and this provides resistance to rotation and then an assistive feel to ramping down and into the new mode position. With it held into the new mode, the joint 151 and 152 are aligned to allow for easy re-insertion into receiving tube 23. It is within the scope of the present invention to use other spring types. It is also conceived that other approaches to the joint detent 163 and joint groove 164 features (i.e., a plate detent features and another with grooves), could be used other than the integrally molded features shown in FIGS. 19A and 19B.

Figure 20A:
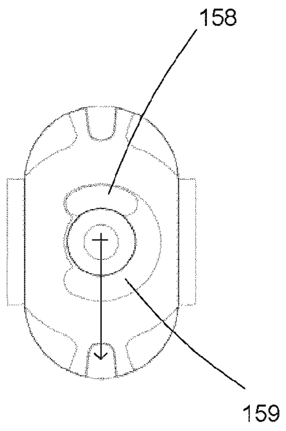
FIGS. 20A-C illustrate cross sectional views of the top and bottom joint of a handle rotation mechanism in transport chair mode, between transport chair and rollator modes, and in rollator mode, respectively.
Figure 20B:
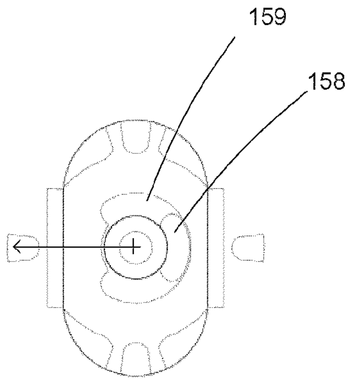
Figure 20C:
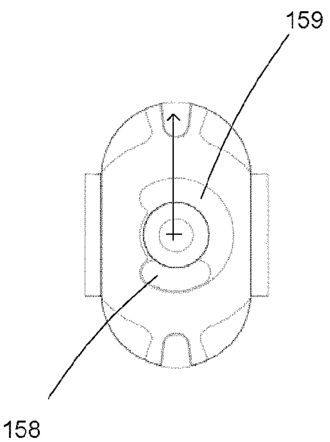

FIGS. 20A-C further depict a cross sectional view of the pivot joint assembly of FIGS. 19A and 19B in transport mode (FIG. 20A), between transport chair and rollator modes (FIG. 20B), and in rollator mode (FIG. 20C).

In use, the handle rotation mechanism is deployed by disengaging the height adjust lock lever, pulling the handle extension shaft out of the handle receiving tube until the pivot joint is exposed, rotating the handle extension shaft so that the handle assembly is position in the alternate modal orientation, dropping the handle extension shaft down to the desired height, and re-engaging the height adjust lock lever to secure the handle into the desired modal orientation.

Placing the pivot joint at the bottom of the handle extension shaft provides the handle support member with improved rigidity since the modal pivot is deep within the receiving tube in both rollator and transport modes, rather than at the handle location, which ensures that it is not subject to twisting or bending forces during use.

In a preferred embodiment, the handle extension shaft is rotatable through 180 degrees relative to the receiving tube thus providing for the conversion of the handle assembly between the rollator configuration and the transport configuration. Rotation of the extension shaft is facilitated by a handle rotation mechanism comprising a pivot joint associated with the extension shaft.

In one embodiment, the pivot joint is located at the base of the extension shaft, and optionally includes features to resist complete pullout. By locating the pivot joint at the base of the extension shaft, exposure of the extension shaft to stresses and strains during the adjustment process can be minimized.

In addition to being in different relative rotational positions for each of the rollator and transport modes, the handle assemblies can also be beneficially raised or lowered to different heights for each mode according to the requirements of the respective users.

In a preferred embodiment, the height adjust lock lever is the only mechanism that requires manipulation to adjust both handle height and handle orientation mode, thus providing a simplified system for converting the mobility device between rollator and transport modes. This minimizes the introduction of excessive "play" between components that can result from the inclusion of additional mechanisms (hinges, pivots, etc.) to allow the modal change.

Figure 8A:
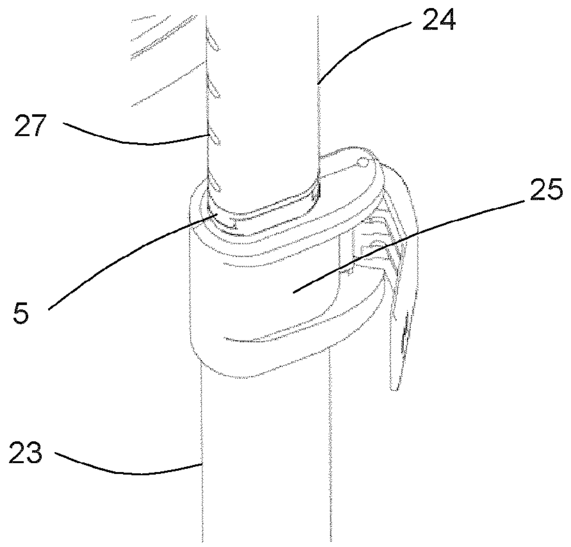
FIG. 8A illustrates a partial perspective view of a handle support member with the handle extension shaft in transport chair mode, in accordance with one embodiment of the invention.
Figure 8B:
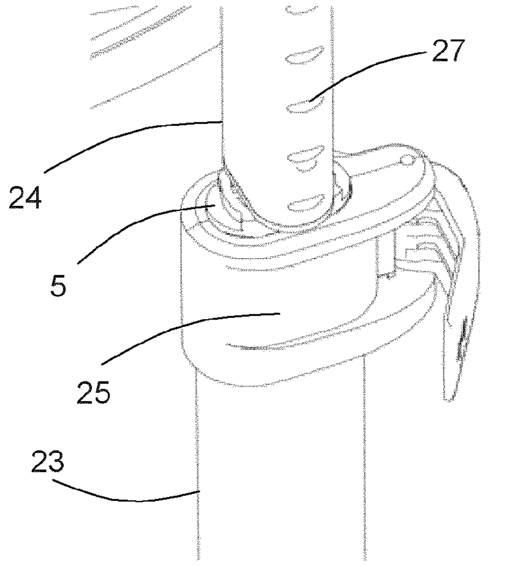
FIG. 8B illustrates a partial perspective view of a handle support member with the handle extension shaft between rollator and transport chair mode, in accordance with one embodiment of the invention.
Figure 8C:
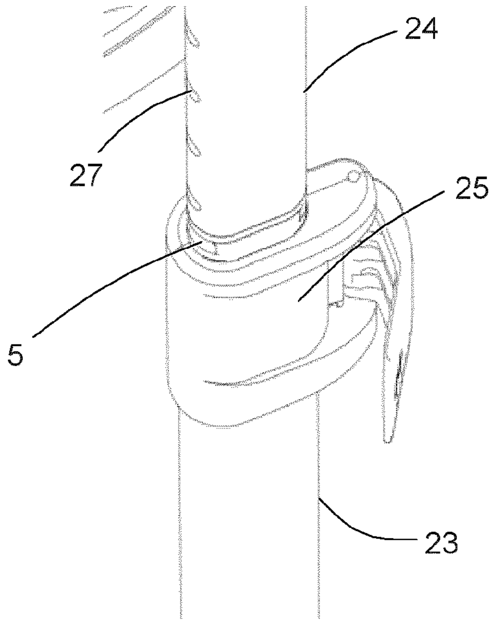
FIG. 8C illustrates a partial perspective view of a handle support member with the handle extension shaft in rollator mode, in accordance with one embodiment of the invention.

In the embodiment depicted in FIGS. 8A-C, handle support member 2 is shown at full extension in transport mode (FIG. 8A), between transport chair and rollator modes (FIG. 8B), and in rollator mode (FIG. 8C). Shown is handle extension shaft 24 with indexing detents 27 for locking, receiving tube 23 for receiving handle extension shaft 24, locking assembly 25 attached to receiving tube 23, and pivot joint assembly 5 attached to bottom of handle extension shaft 24.

Figure 22A:
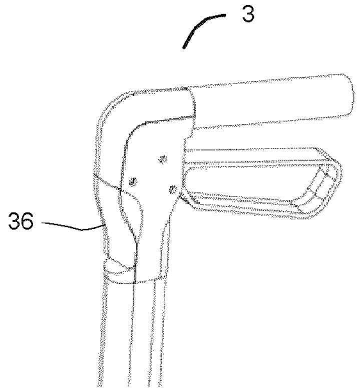
FIGS. 22A-E illustrate perspective views of a pivoting handle assembly portion in accordance with one embodiment of the invention.
Figure 22B:
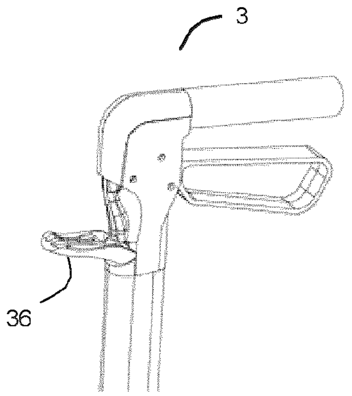
Figure 22C:
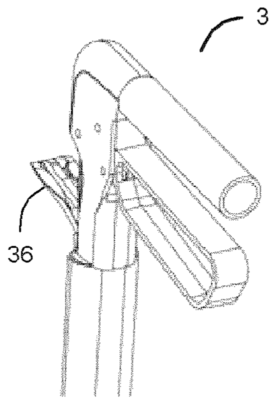
Figure 22D:
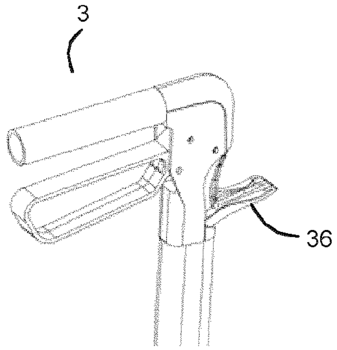
Figure 22E:
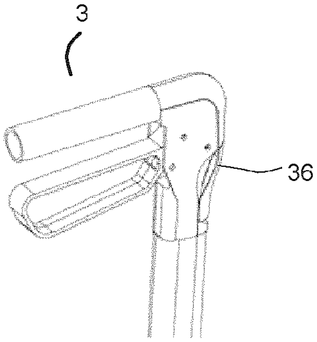

FIGS. 22A-E depict a pivoting handle assembly portion in accordance with one embodiment of the invention. In this embodiment, handle assembly 3 employs locking lever 36 that, when released, allows rotation of handle assembly 3 between transport chair and rollator modes. FIG. 22A depicts handle assembly 3 in transport mode with locking lever 36 in locked position, FIG. 22B depicts handle assembly 3 in transport mode with locking lever 36 in released position, FIG. 22C depicts handle assembly 3 in between transport and rollator modes with locking lever 36 in released position, FIG. 22D depicts handle assembly 3 in rollator mode with locking lever 36 in released position, and FIG. 22E depicts handle assembly 3 in rollator mode with locking lever 36 in locked position.

An alternative embodiment of a pivot joint suitable for use in the present invention is depicted in FIGS. 23A-E, 24A-B, and 25A-B. This embodiment employs locking lever 136 that, when released, allows conversion of the handle assembly between transport chair and rollator modes. Pivot joint 35 comprises top pivot joint 351 and bottom pivot joint 352, wherein the top joint is rotatable relative to the bottom joint and the bottom joint remains in a fixed position relative to the handle receiving tube (not shown). Pivot joint 35 is also provided with mounting assembly 353, on which the handle assembly (not shown) can be mounted.

Figure 23A:
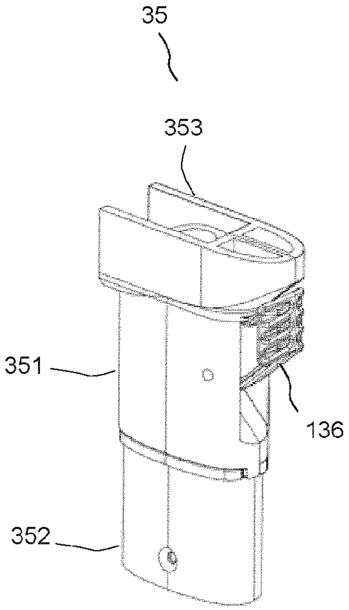
FIGS. 23A-E illustrate perspective views of a handle rotation mechanism for use with a mobility device in accordance with one embodiment of the invention.
Figure 23B:
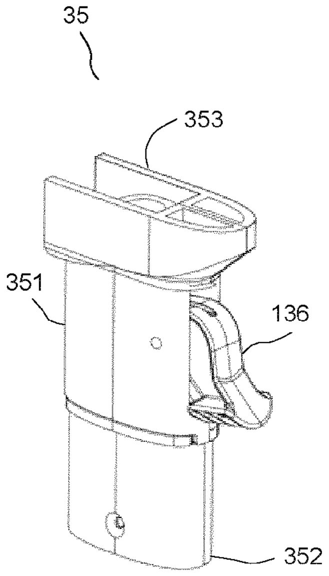
Figure 23C:
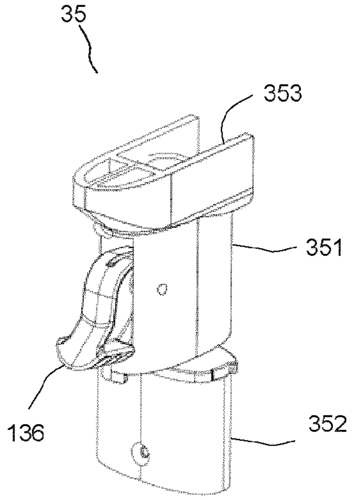
Figure 23D:
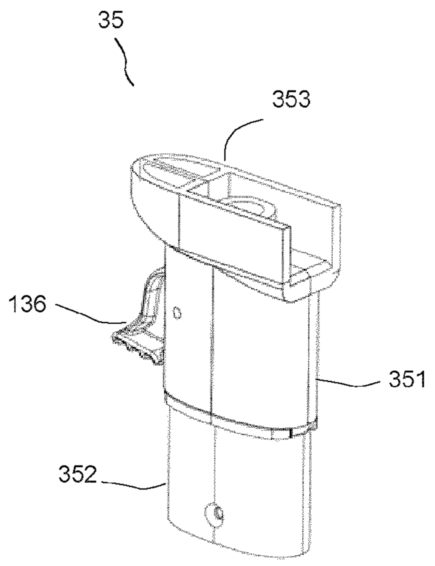
Figure 23E:
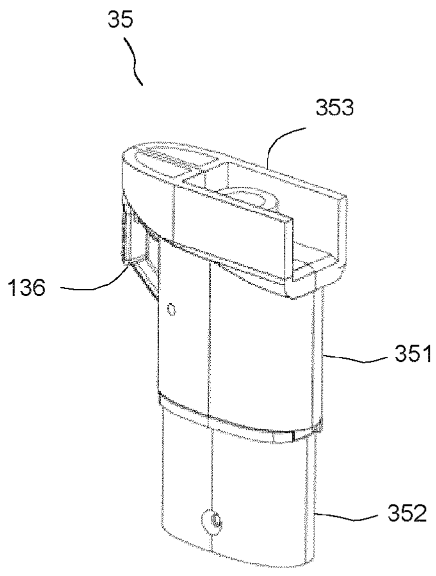

FIG. 23A depicts pivot joint 35 in transport mode with locking lever 136 in locked position, FIG. 23B depicts pivot joint 35 in transport mode with locking lever 136 in released position, FIG. 23C depicts pivot joint 35 in between transport and rollator modes with locking lever 136 in released position, FIG. 23D depicts pivot joint 35 in rollator mode with locking lever 136 in released position, and FIG. 23E depicts pivot joint 35 in rollator mode with locking lever 136 in locked position.

Figure 24A:
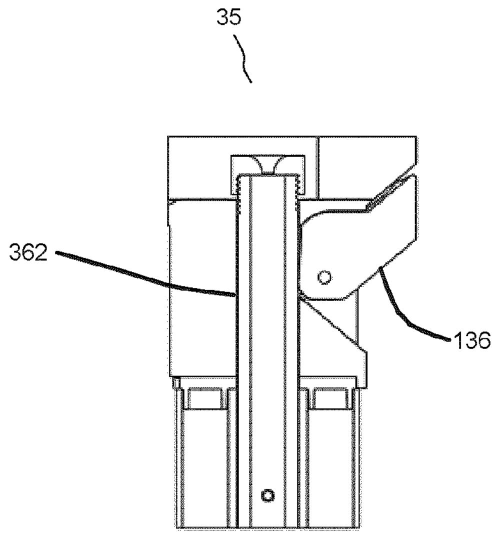
FIGS. 24A-B illustrate cross sectional views of the locking mechanism of FIGS. 23A-E.
Figure 24B:
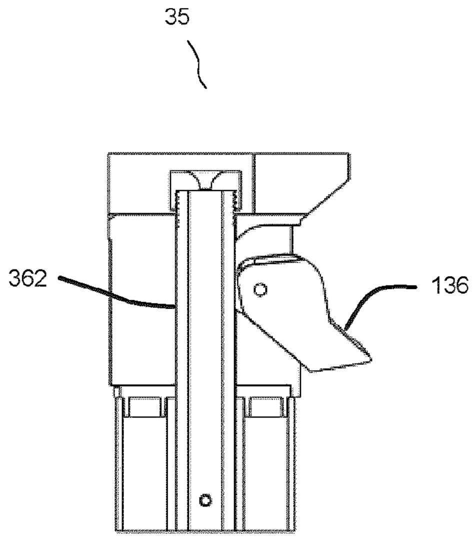

FIG. 24A is a cross-sectional view of pivot joint 35, showing locking lever 136 in the locked position, which stops rotation of top joint 351 around rotation shaft 362 through engagement of slot 369 located on the locking lever with keying rib 358 located on rotation shaft 362. FIG. 24B depicts locking lever 136 in the released position, resulting in the disengagement of slot 369 located on the locking lever 136 from keying rib 358 located on rotation shaft 362, thus allowing rotation of top joint 351 relative to bottom joint 352.

Figure 25A:
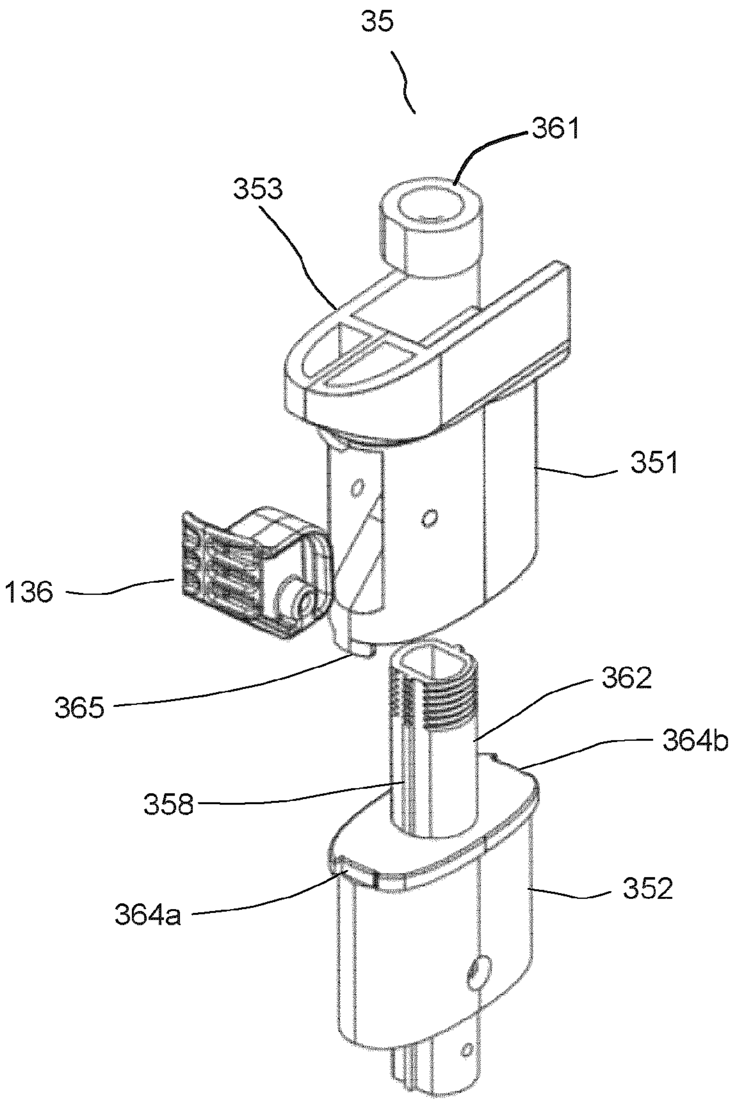
FIG. 25A illustrates a top exploded view of the top and bottom joint components of a handle rotation mechanism for use with a mobility device in accordance with one embodiment of the invention.
Figure 25B:
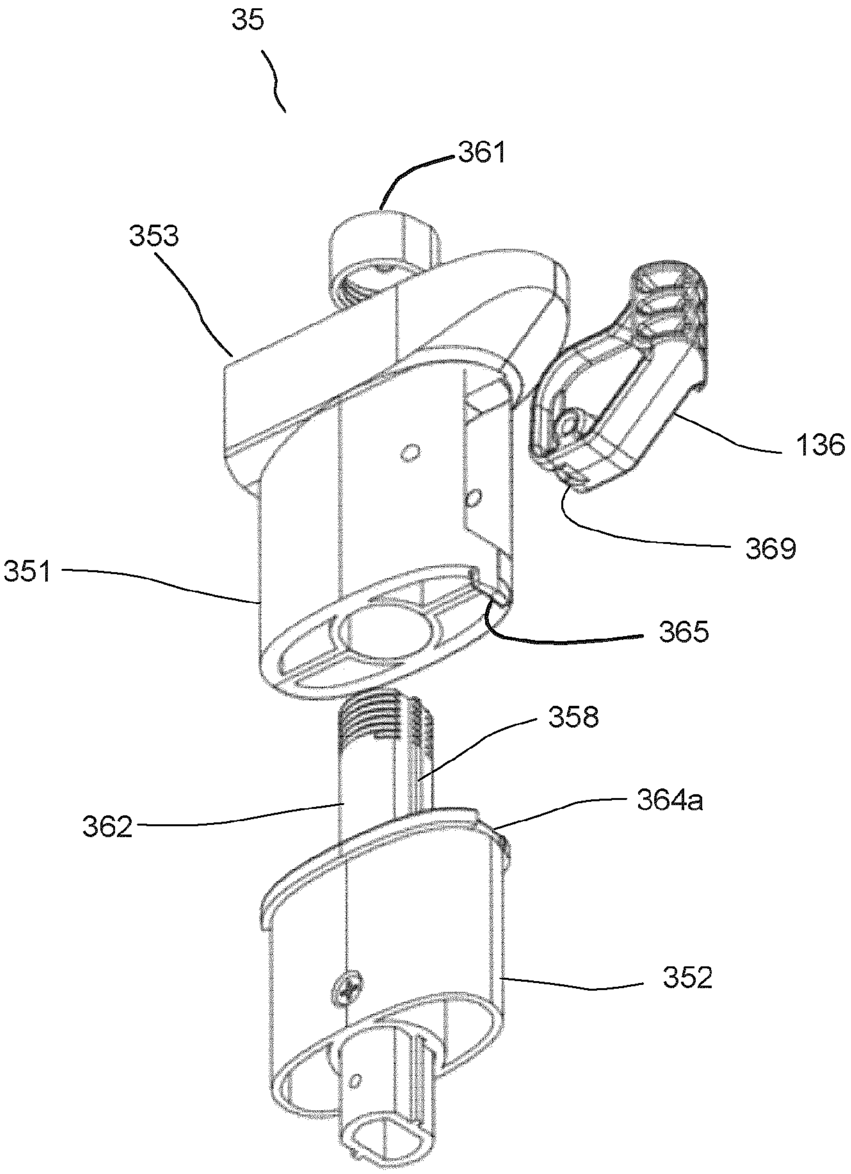
FIG. 25B illustrates a bottom exploded view of the top and bottom joint components of a handle rotation mechanism for use with a mobility device in accordance with one embodiment of the invention.
Figure 26:
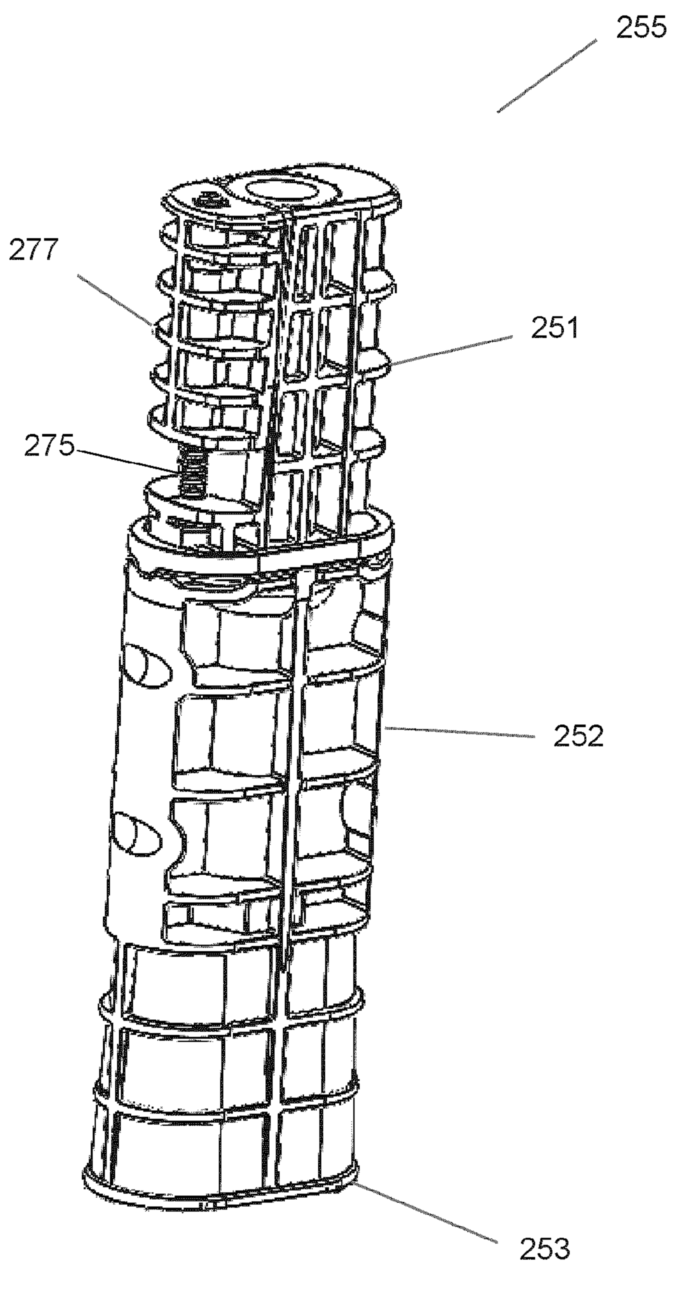
FIG. 26 illustrates a perspective view of the top and bottom joint components of a handle rotation mechanism, for use with a mobility device in accordance with one embodiment of the invention.

FIGS. 25A and 25B show further detail of pivot joint 35, in particular the respective lock zones 364*a,b* located on bottom joint 352 which engage with detent 365 located on top joint 351 when in chair or rollator mode.

FIGS. 26, 27A-B, 28A-C and 29A-B depict an alternative embodiment of a pivot joint suitable for use in the present invention.

In accordance with this embodiment, the handle rotation mechanism is a pivot joint 225 comprising top pivot joint 251 and bottom pivot joint 252, wherein the top joint is rotatable relative to the bottom joint and the bottom joint remains in a fixed position within the handle receiving tube. Also shown is annular flange bead 253, which prevents the pivot joint from being pulled out of handle receiving tube 23.

Figure 27A:
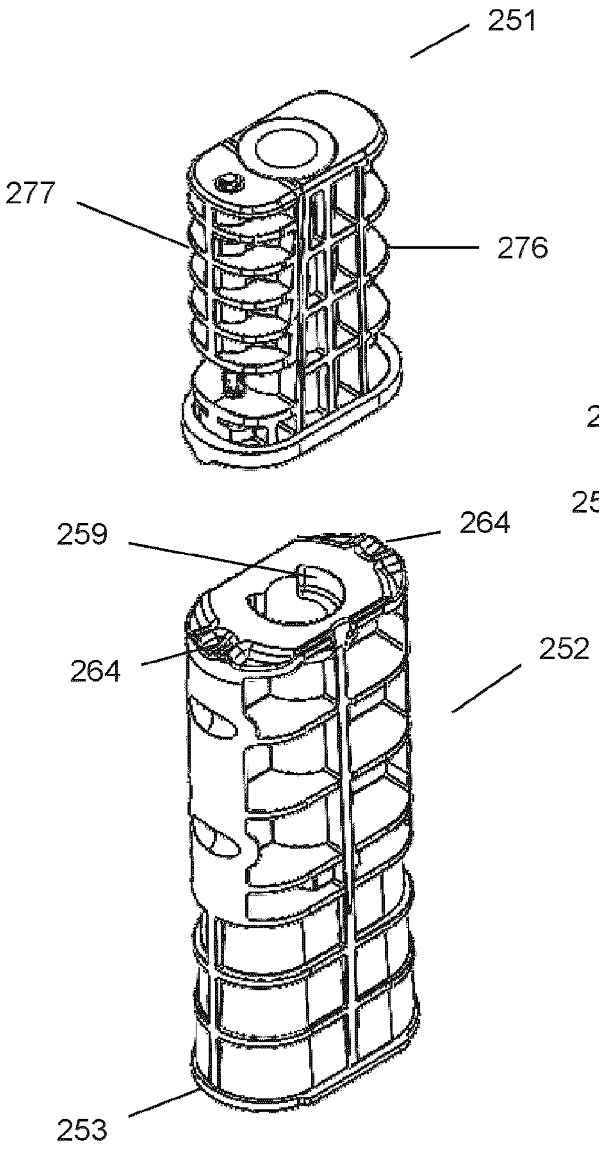
FIG. 27A illustrates a top exploded view of the top and bottom joint components of a handle rotation mechanism for use with a mobility device in accordance with one embodiment of the invention.
Figure 27B:
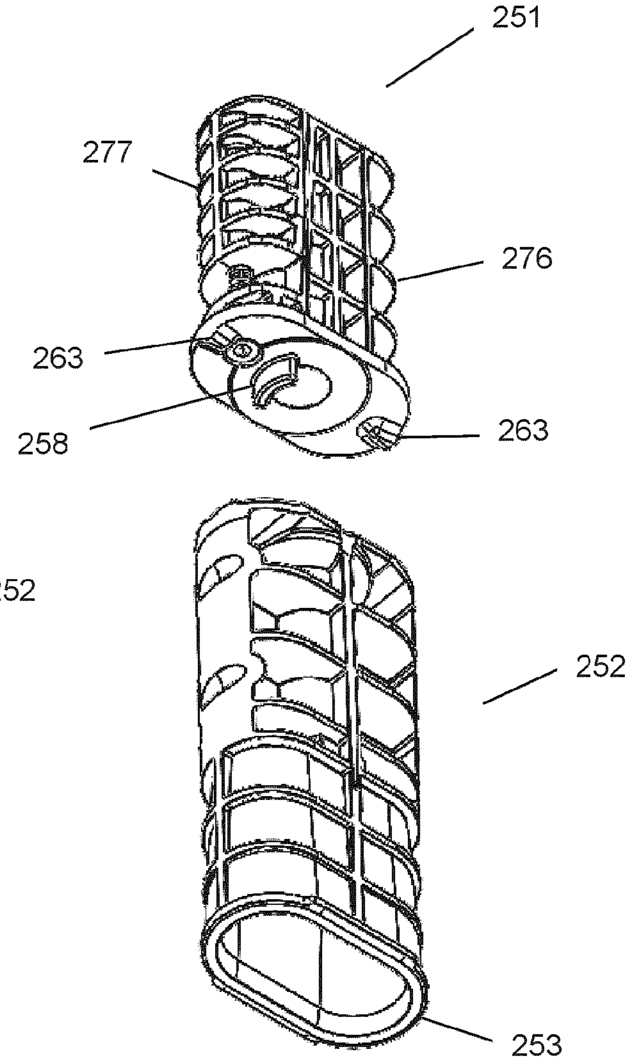
FIG. 27B illustrates a bottom exploded view of the top and bottom joint components of a handle rotation mechanism for use with a mobility device in accordance with one embodiment of the invention.

As depicted in FIGS. 27A and 27B, top joint is provided with protrusion element 258 that extends into receiving channel 259 on bottom joint 252. Receiving channel 259 is shaped to limit top joint rotation through 180 degrees, between a first mode and a second mode. Top joint 251 pulls away from bottom joint 252 as a result of the ramped shapes of detent tabs 263 and detent grooves 264 that drive a vertical motion from the user applied rotational motion, to provide enough separation between joints to enable rotation of the top joint about rotation bolt (not shown). In a similar manner to that illustrated in the embodiment depicted in FIGS. 18, and 19A-B, compression spring (not shown), held in place by nut (not shown), is provided to bias top joint 251 into contact with bottom joint 252, while also allowing for separation between the two joints. When top joint 251 is rotated to either of the first and second modes, the user can reinsert handle support 24 into the receiving tube 23. The compression spring captured within the nut and bolt holds top joint 251 and bottom joint 252 together, but the ramping function overcomes the spring, and this provides resistance to rotation and then an assistive feel to ramping down and into the new mode position. With it held into the new mode, the joint 251 and 252 are aligned to allow for easy re-insertion into receiving tube 23. It is within the scope of the present invention to use other spring types. It is also conceived that other approaches to the joint detent 263 and joint groove 264 features (i.e., a plate detent features and another with grooves), could be used other than the integrally molded features shown in FIGS. 27A and 27B.

In the embodiment depicted in FIGS. 26, 27A-B, 28A-C and 29A-B, top pivot joint 251 is provided as a two part component, including a main body 276 and an adjustable sliding wedge 277 movable relative to the main body and which is employed to retain the top pivot joint within the handle extension shaft 24 through adjustment of a threaded screw 275.

Figure 28A:
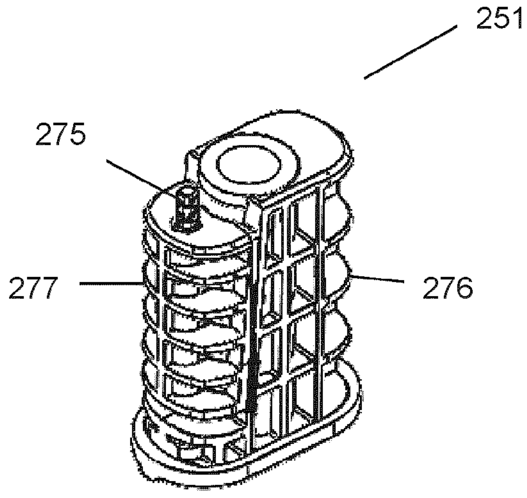
FIGS. 28A-C illustrate perspective views of the top joint components of a handle rotation mechanism for use with a mobility device in accordance with one embodiment of the invention.
Figure 28B:
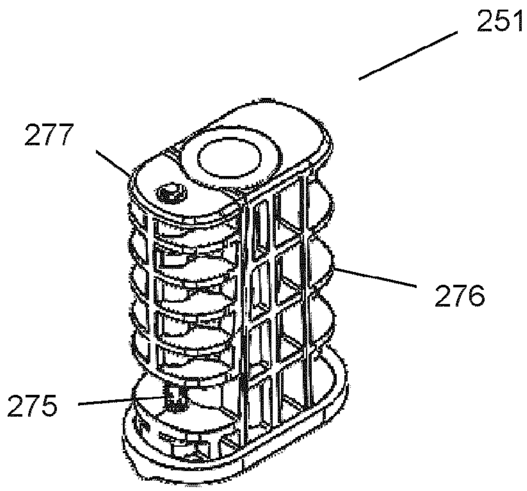
Figure 28C:
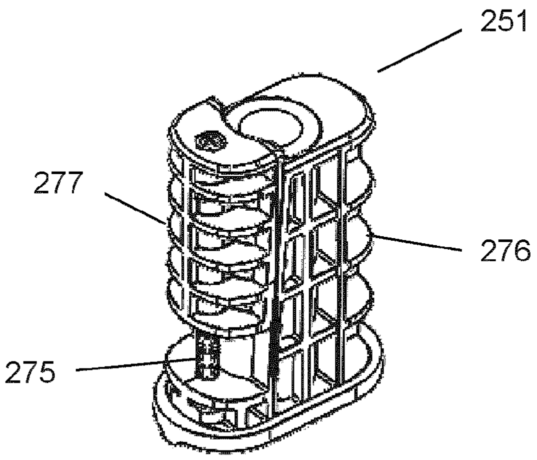
Figure 29A:
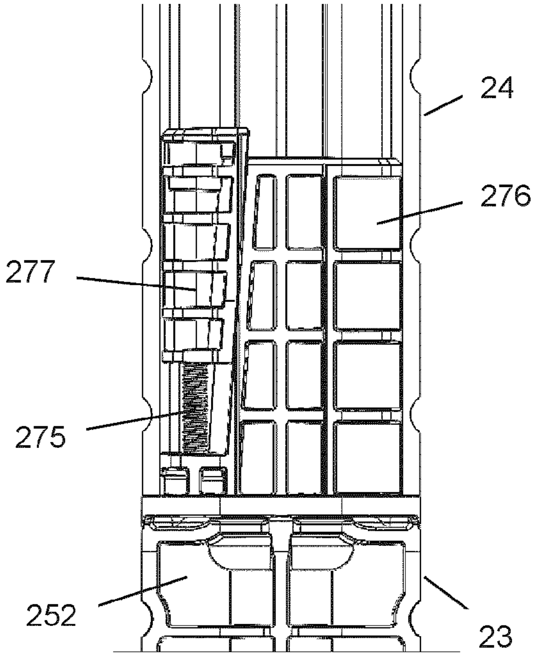
FIG. 29A-B illustrate cross-sectional views of the pivot joint components of a handle rotation mechanism within the receiving tubes for use with a mobility device in accordance with one embodiment of the invention.
Figure 29B:
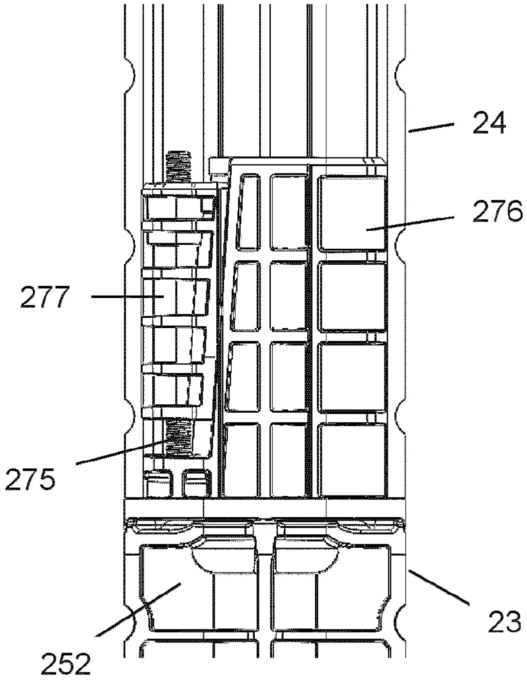

Prior to installation in handle extension shaft 24, top pivot joint 251 is provided with sliding wedge 277 in the "up" position as depicted in FIG. 28C. Upon installation in handle extension shaft 24 (FIG. 29A), threaded screw 275 is adjusted to move sliding wedge 277 toward the "down" position depicted in FIG. 28A until the sliding wedge 277 is in tight contact with the inner wall of handle extension tube 24 (FIG. 29B). This ensures a tight fit within the extension tube, preventing inadvertent removal of top pivot joint 251 from the tube in use.

In an alternative embodiment, the handle rotation mechanism may be provided closer to the handle end of the handle extension shaft. In such an embodiment, the handle rotation can be carried out independently of the height adjustment process.

Braking System

In a preferred embodiment, the mobility device further comprises a braking system configured to allow the user to limit the movement of the mobility device.

In accordance with this embodiment, the braking system preferably comprises a braking mechanism associated with one or both of the rear wheels, a brake lever associated with the handle assembly, and a brake linkage system connecting the braking mechanism and the brake lever.

Accordingly, the handle assembly of the mobility device includes a brake lever which is connected via a brake linkage system to a braking mechanism, whereby the user's action on the brake lever actuates a braking mechanism that is associated with a corresponding wheel.

In one embodiment, the brake linkage system is a brake cable extending between the braking mechanism and the brake lever. In one embodiment, the brake linkage system further comprises a brake arm connected to the brake cable and associated with the braking mechanism.

In a preferred embodiment, the braking system is configured to function equally in both modal configurations.

In accordance with one embodiment, the brake linkage comprises a single cable connecting the brake lever to the brake mechanism associated with the corresponding wheel.

In one embodiment, the braking mechanism is a disc brake mechanism. In one embodiment, the braking mechanism is a drum brake mechanism. In one embodiment, the braking mechanism is configured to apply frictional force directly to the tread of the wheel. In one embodiment, the braking mechanism can be electric where braking forces drive a generator, allowing the option of capturing the generated electricity for use by assistive motorization. In another embodiment, any of the described braking mechanisms can be actuated using an electric motor or servomotor which provides the mechanical force for actuating the brake. In such an embodiment, the signal to trigger and release the brakes is provided by the user via one or both brake handles, or via a single brake handle input that can then actuate both brakes. In one embodiment, the signal to trigger and release the brakes is provided as a result of the processing of information gathered from sensors including, but not limited to, velocity sensors and/or proximity sensors. In one embodiment, the braking mechanisms are controlled using a low force use input device, or by voice control.

In one embodiment, the braking system is configured for instantaneous braking when the user pulls up on the brake lever, and for a "parking style" brake when the user pushes down on the brake lever.

In one embodiment, the brake cable system is provided internal to the frame structure, including a cable loop that passes through multiple frame structure members. In a preferred embodiment, the brake cable extending from the brake lever to the brake mechanism passes through the handle support member components, including the handle extension shaft, the receiving tube and the pivot joint. This configuration protects the brake cables from damage due to catching or snagging during use.

Figure 12:
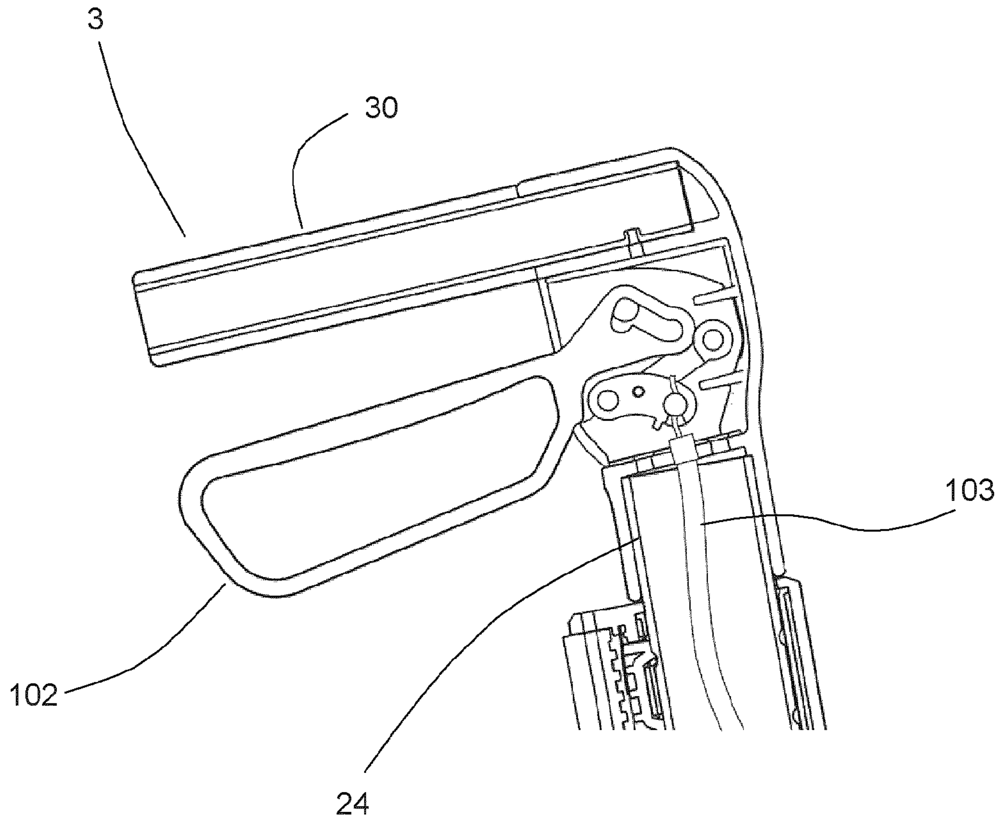
FIG. 12 illustrates a cross sectional view of the handle assembly portion of a braking mechanism in accordance with one embodiment of the invention.
Figure 13A:
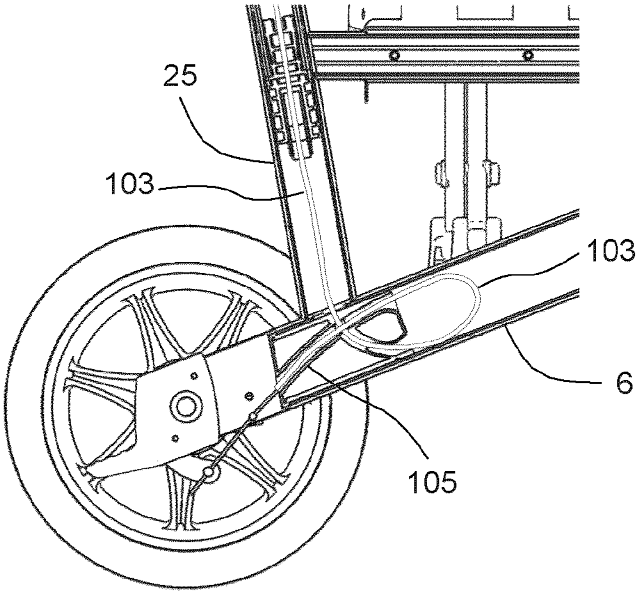
FIG. 13A illustrates a partial cutaway view of a braking mechanism for use with a mobility device in accordance with one embodiment of the invention.
Figure 13B:
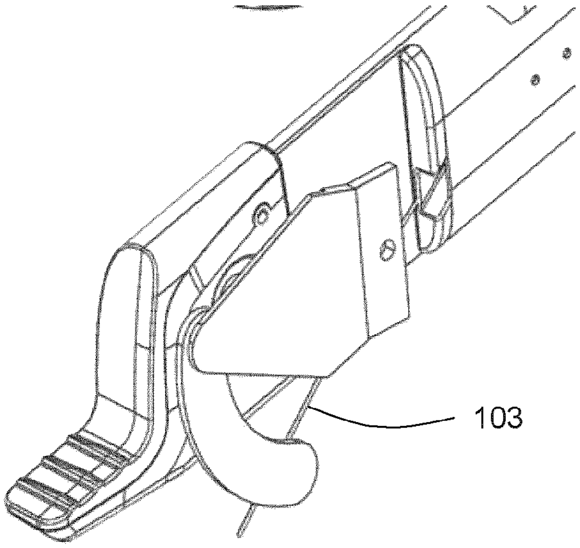
FIG. 13B illustrates a perspective view of a braking mechanism for use with a mobility device in accordance with one embodiment of the invention.

In the embodiment depicted in FIGS. 12, 13A and 13B, the braking system comprises a single shielded cable 103 connecting the brake lever 102 to the brake mechanism (not shown). From the brake lever and its anchoring features, cable 103 travels through the interior of handle extension shaft 24 and handle receiving tube 25 of the handle support member 2, then at the intersection of handle support member 2 and wheel rail member 6, the cable is redirected to the wheel and brake mechanism.

In this embodiment, at the transition between vertical handle support member and the horizontal wheel rail member there is provided cable management component 105 that is insertable into the wheel rail member from its end such that it is in communication with the handle receiving tube. The cable management feature allows for management of the brake cable while also accommodating a loop of cable sufficient for the range of height adjustments, which can vary up to 8-12 inches in height at full extension.

In one embodiment, cable management component is a formed plastic cable loop manager that prevents the cable from reaching its bend radius limits. The cable management component also guides the flow of the internally stored brake cable required when the height of the handled is adjusted. In one embodiment, the cable management component terminates at the open end of the tube that it sits within. In another embodiment, the cable management component is only internal.

In one embodiment, the braking mechanism further comprises a foot activated brake control to provide the user with an additional stopping actuator option. In one embodiment, the foot activated brake control is associated with the cable management component.

Figure 21A:
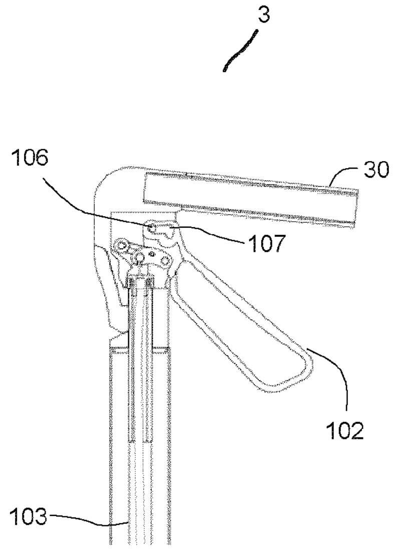
FIGS. 21A-C illustrate cross sectional views of a handle assembly portion of a braking mechanism in accordance with one embodiment of the invention.
Figure 21B:
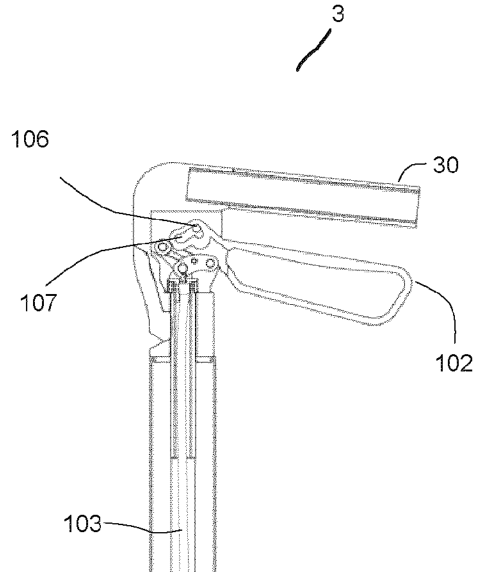
Figure 21C:
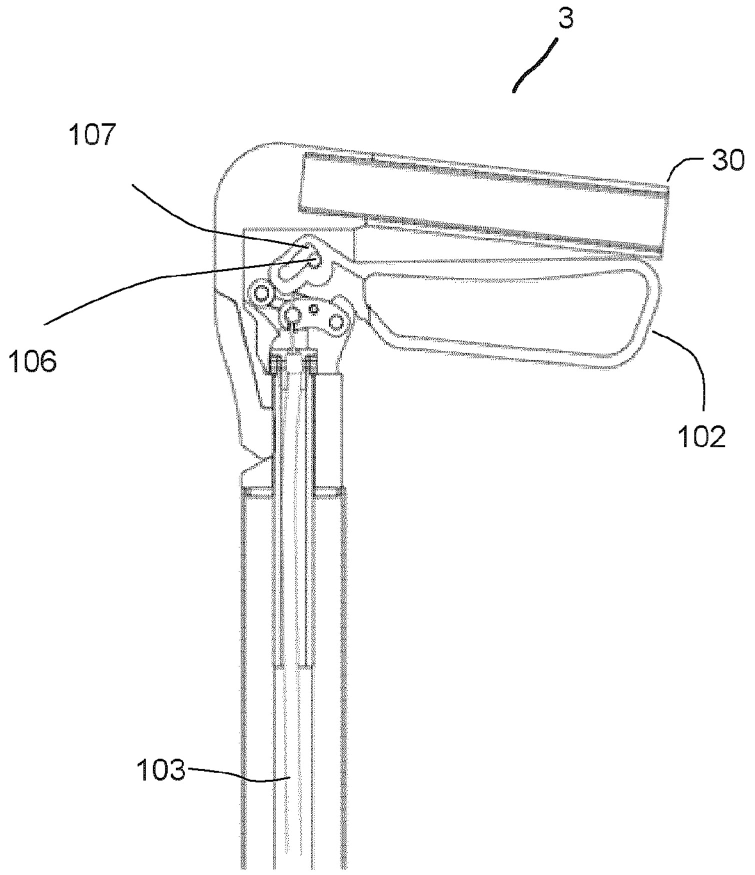

FIGS. 21A-C illustrate cross sectional views of a handle assembly portion of a braking mechanism in accordance with one embodiment of the invention of a compact linkage mechanism that transfers user's actuation motion to brake cable motion. FIG. 21A depicts brake lever 102 in a downward locked position, with actuation tab 106 located in the "locked brake" position of actuation guide 107, which causes the brake mechanism to be maintained in a braking configuration without user action on brake lever 102. FIG. 21C depicts brake lever 102 in an upward position, with actuation tab 106 located in the "brake" position of actuation guide 107, which causes the brake mechanism to be maintained in a braking configuration only with user action on brake lever 102. FIG. 21B depicts brake lever 102 in an intermediate position, with actuation tab 106 located in the "brake release" position of actuation guide 107, which causes the brake mechanism to be maintained in the open configuration.

Seat Bottom

The mobility device of the present invention also comprises a seat bottom extending between the two side frame structures and attached to a respective seat rail. In a preferred embodiment, the seat bottom is convertible between an unfolded/deployed state and a folded/collapsed state, and comprises a first seat bottom member hingedly attached to a second seat member. In a preferred embodiment, each of the first and second seat members is also hingedly attached a frame mount element that is attached to a respective seat rail.

In accordance with the present invention, the mobility device can be easily converted between the deployed state and the storage state by folding along the three hinged connections.

In a preferred embodiment, the mobility device further comprises a locking mechanism to lock the seat bottom in a desired configuration. In one embodiment, the locking mechanism is configured to lock the seat in the deployed state. In one embodiment, the locking mechanism is configured to lock the seat bottom in the collapsed state.

In one embodiment, the mobility device further comprises a cross brace assembly extending between the two side frame structures to provide structural stability. In a preferred embodiment, the cross brace assembly comprises two cross members, each of the cross members extending between a frame mount on one of the side frame structures and the wheel rail member of the other of the side frame structures. In a preferred embodiment, each cross member comprises a collapsing link hingeably attached at a lower end of the cross member, wherein the collapsing link is configured to collapse/fold when the mobility device is in the collapsed state. In one embodiment, the collapsing link is a molded element.

Figure 14:
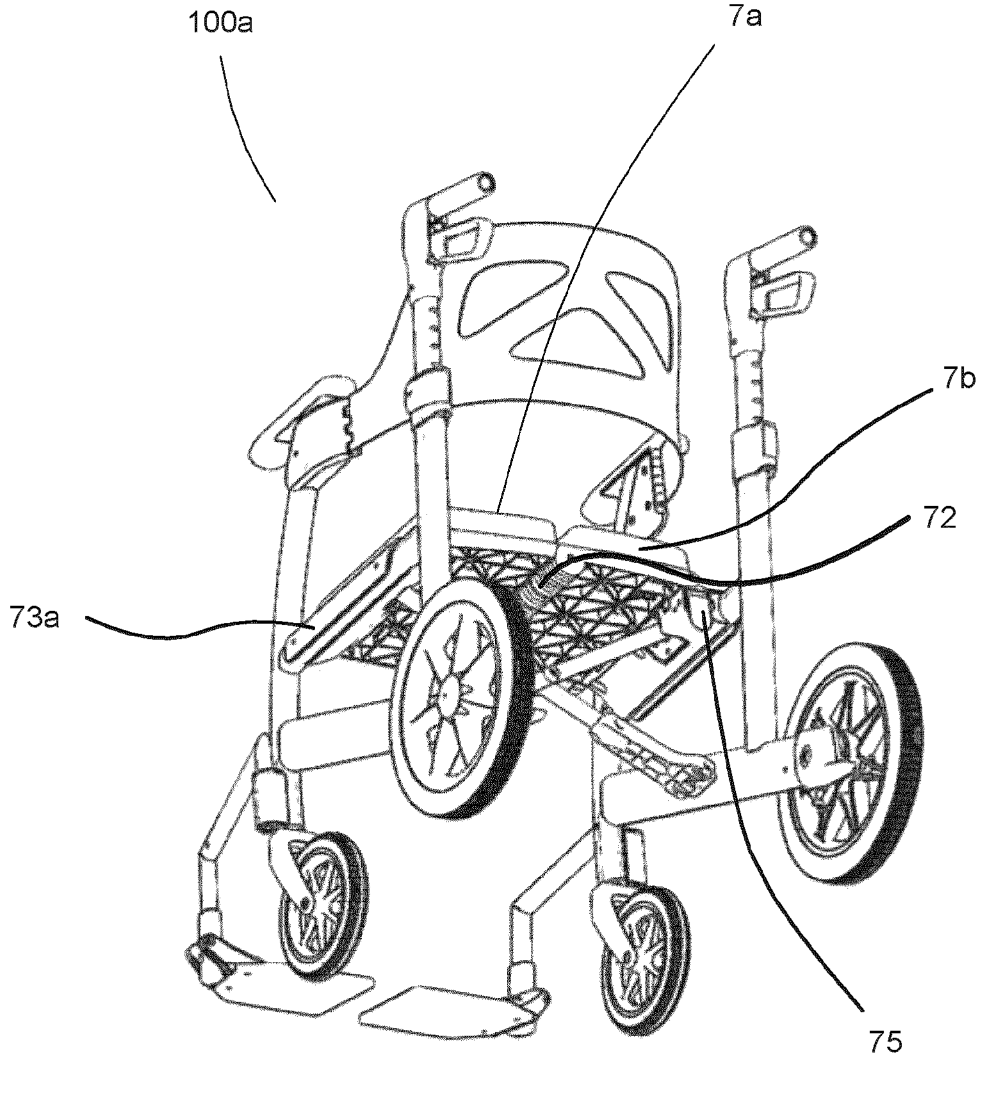
FIG. 14 illustrates a bottom perspective view of a mobility device in accordance with one embodiment of the invention.
Figure 15:
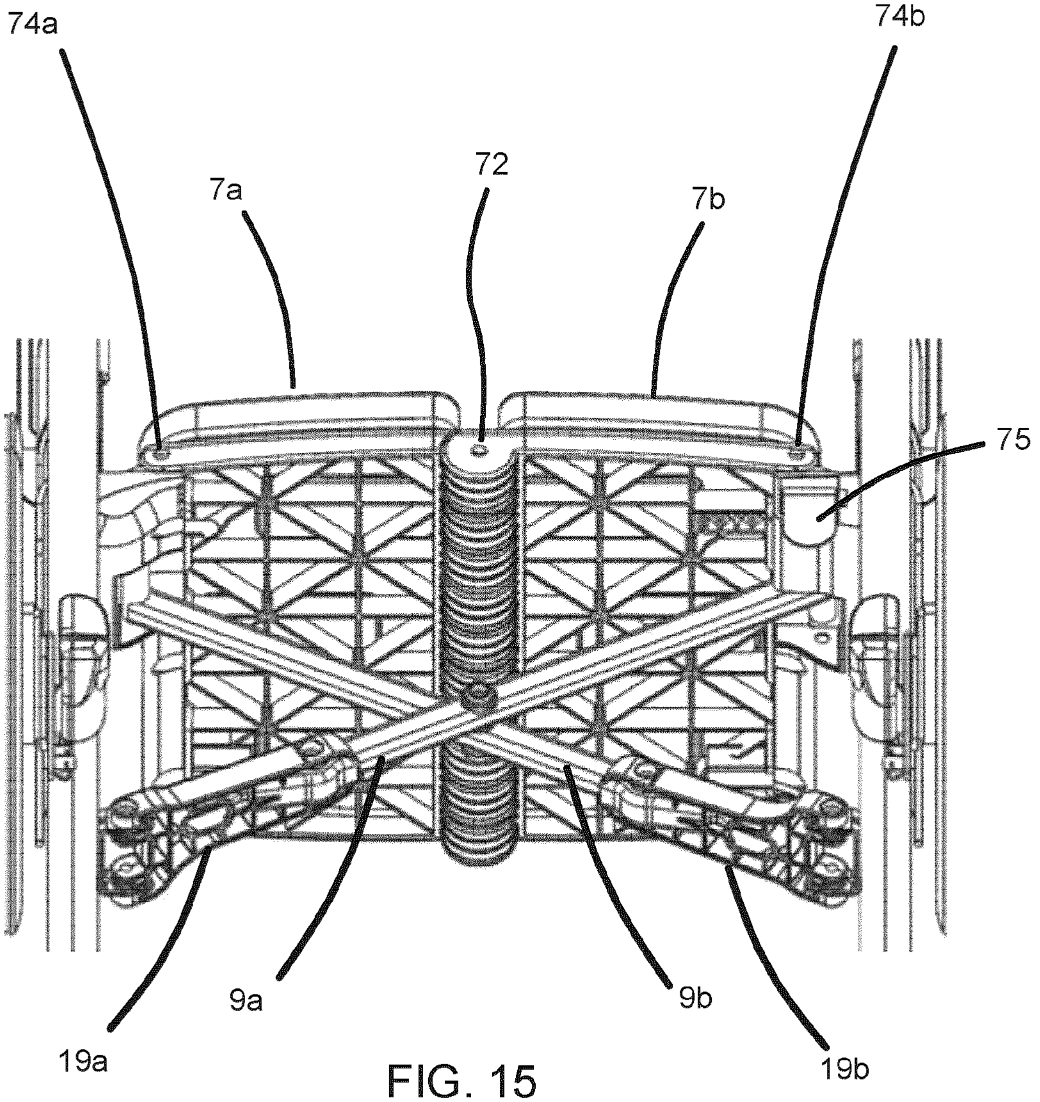
FIG. 15 illustrates a bottom view of a seat bottom and cross brace, including mounting elements, for use with a mobility device in accordance with one embodiment of the invention.
Figure 16:
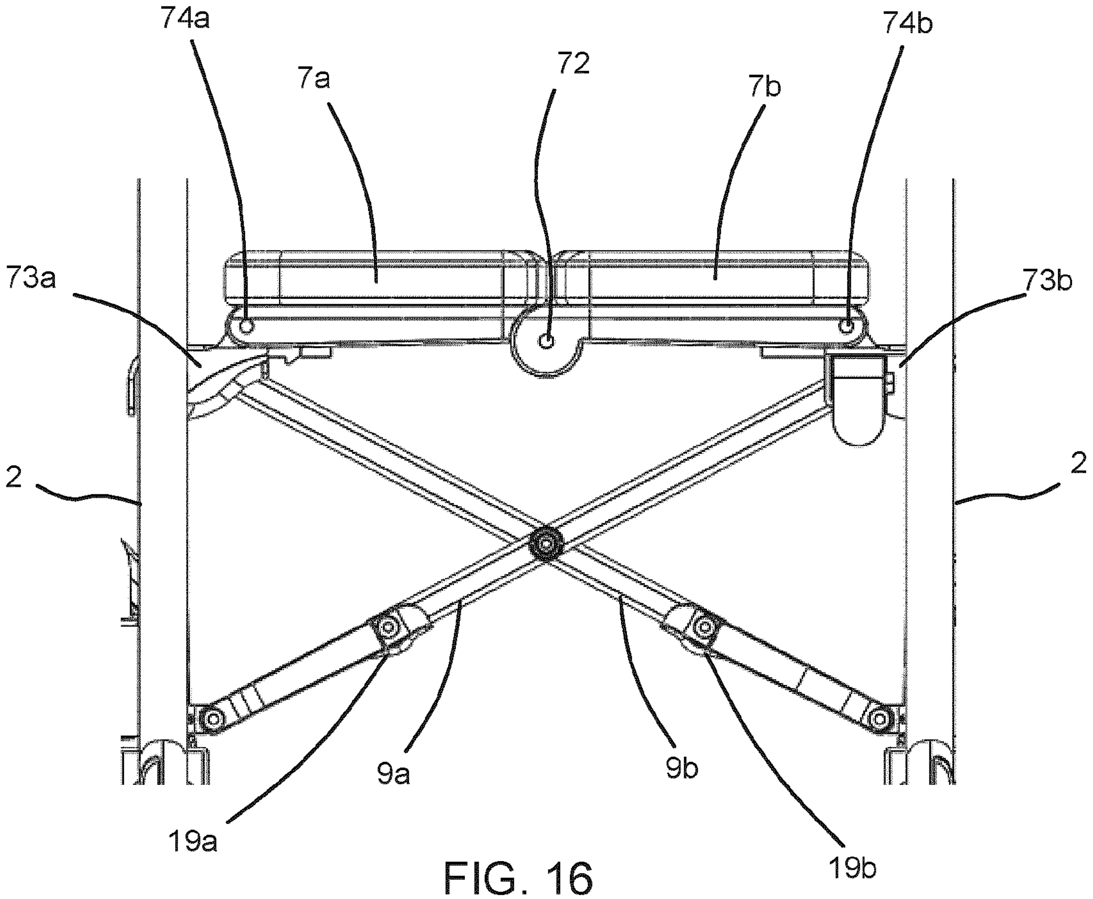
FIG. 16 illustrates a rear partial view of a seat bottom and cross brace of a mobility device in accordance with one embodiment of the invention.

In the embodiment depicted in FIGS. 14, 15 and 16, seat bottom 7 comprises first seat bottom member 7*a* hingedly attached to second seat member 7*b* by seat hinge 72, wherein each of the first and second seat members is respectively attached by seat mount hinges 74*a,b* to frame mount elements 73*a,b*, each frame mount element 73*a,b* being attached to a respective seat rail member 8. Also shown is seat lock 75, cross members 9*a,b* and collapsing links 19*a,b*, provided as molded elements hingedly linked at one end to a respective cross member and at the other end to a respective side frame structure. In one embodiment, the central seat hinge 72 has a handle or strap attached to it that is accessible from above by the user. In such an embodiment, the handle rests within the space between the first and second seat members of each seat bottom such that the user does not feel the handle when seated. This handle or strap is used by the user to pull up on the seat as the lock is released, initiating the conversion from the deployed state to the storage state.

In one embodiment, the seat members are further provided with padded elements such as cushions.

Foot Rest

Figure 17A:
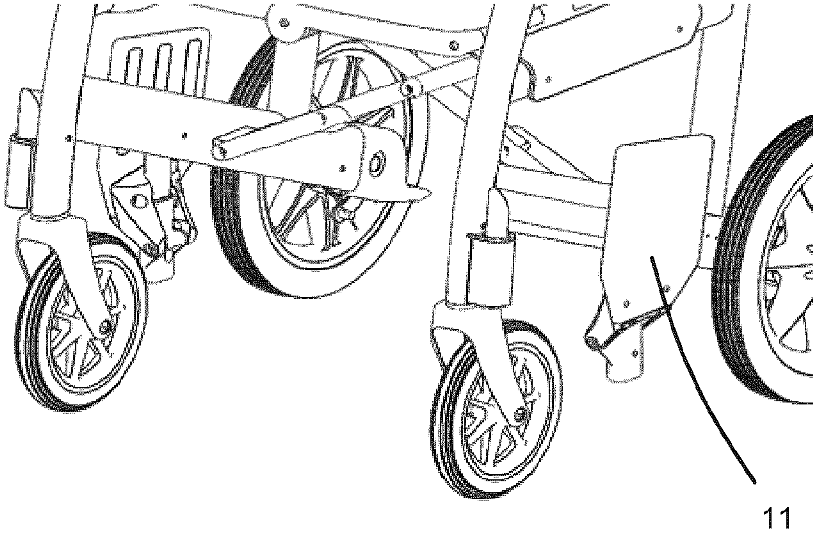
FIG. 17A illustrates a partial perspective view of a footrest member on a mobility device, in a storage position, in accordance with one embodiment of the invention.
Figure 17B:
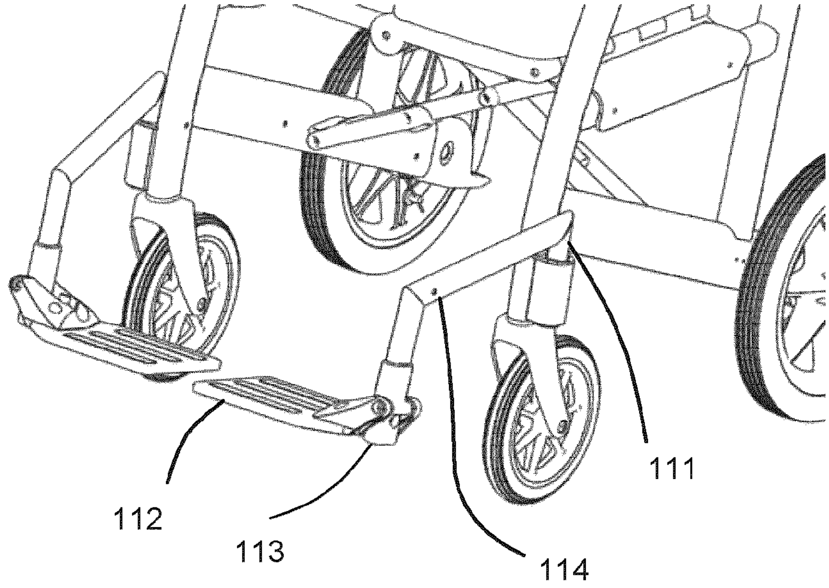
FIG. 17B illustrates a partial perspective view of a footrest member on a mobility device, in a use position, in accordance with one embodiment of the invention.
Figure 18:
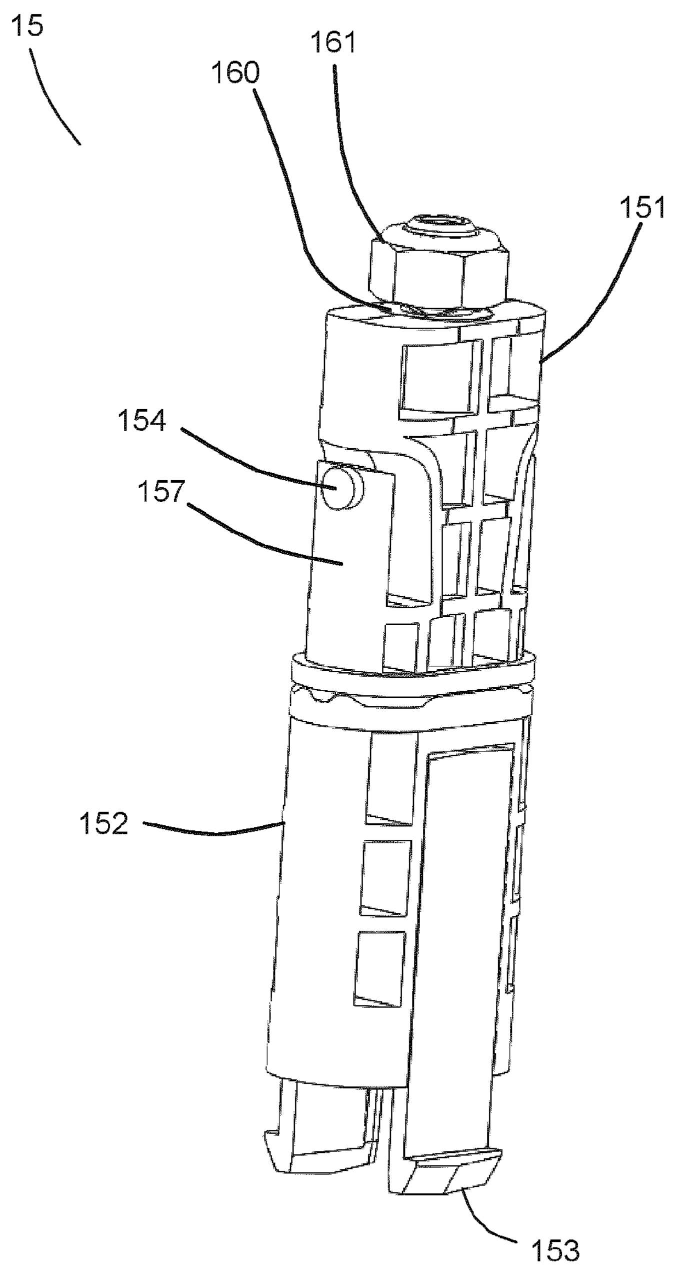
FIG. 18 illustrates a perspective view of the top and bottom joint components of a handle rotation mechanism, for use with a mobility device in accordance with one embodiment of the invention.

In a further embodiment, the mobility device comprises two footrest members mounted to the front of a respective side frame structure, wherein the footrest member is pivotable between a storage position (FIG. 17A) and a use position (FIG. 17B).

In one embodiment, the footrests are provided with a passive locking system where the footrest member is held in each of the use and storage positions by gravity.

In an alternate embodiment, the mobility device is provided with an active locking mechanism requiring a release action before transitioning the footrest member between storage and use positions.

In a preferred embodiment, the footrest member can be transitioned between the storage and use positions without requiring removal from the frame structure. For example, the footrest member can be transitioned between storage and use positions by lifting the pivot arm out of the storage position, rotating the footrest toward the use position, and dropping the footrest into the final use position. The reverse sequence can be carried out to transition from use to storage positions.

FIG. 17B depicts one embodiment of a footrest member comprising pivot arm 111, footrest extension arm 114, foot surface 112, and foot surface pivot mechanism 113.

In the embodiment depicted in FIGS. 17A-B, the user lifts up on pivot arm 111, overcoming gravity to enable rotation of the footrest member out of the current state. The user continues to rotate until the farthest opposite extent is reached at which point the user lets pivot arm 111 drop with gravity into position for the other state.

Figure 35A:
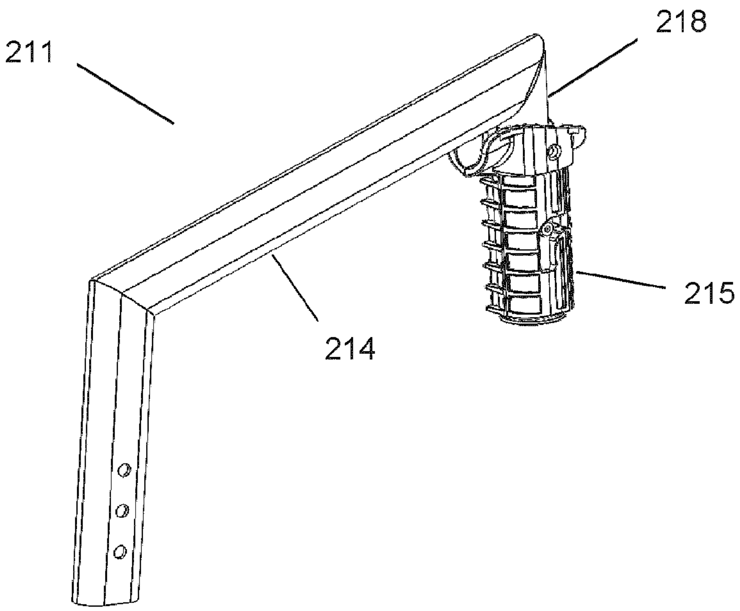
FIG. 35A illustrates a perspective view of a pivot arm for use with a mobility device in accordance with one embodiment of the invention.
Figure 35B:
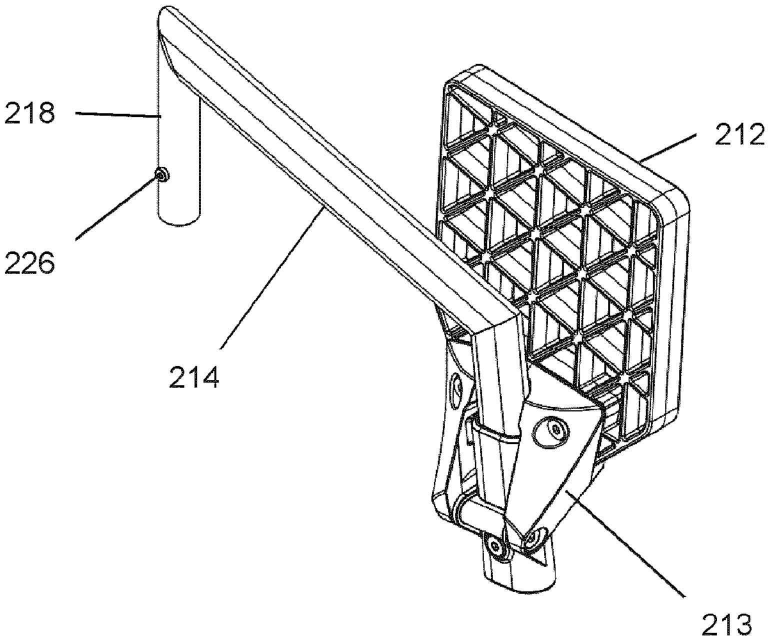
FIG. 35B illustrates a perspective view of a pivot arm and pivot sleeve and footrest member for use with a mobility device in accordance with one embodiment of the invention.
Figure 36A:
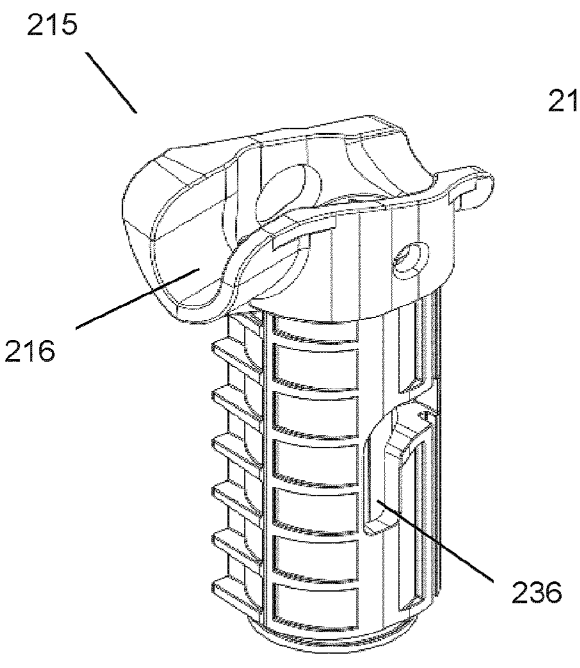
FIG. 36A illustrates a front perspective view of a pivot sleeve for use with a mobility device in accordance with one embodiment of the invention.
Figure 36B:
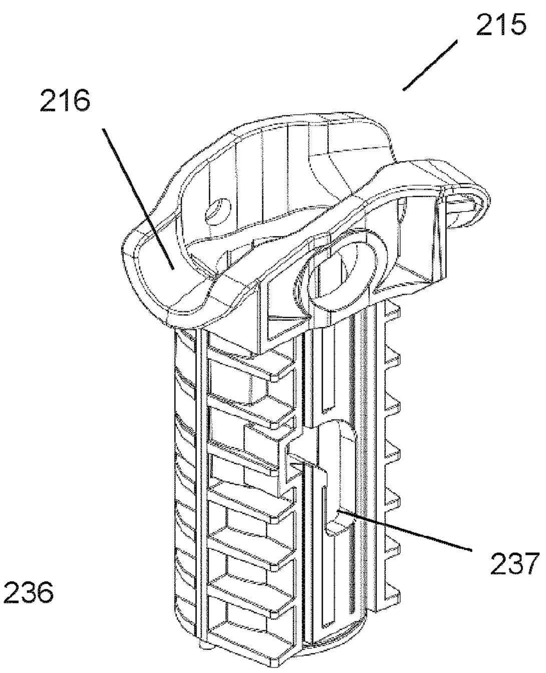
FIG. 36B illustrates a rear perspective view of a pivot sleeve for use with a mobility device in accordance with one embodiment of the invention.

FIGS. 35A-B and 36A-B depict one embodiment of a pivot arm 211 and sleeve 215, suitable for use in retaining the footrest member in storage and use positions. As shown in FIGS. 36A-B, sleeve 215 comprises an angled sleeve trough 216, adapted to receive pivot arm post 218 and footrest extension arm 214 at both the use stopping point and the storage stopping point. In this embodiment, the footrest is lifted to initiate the rotational motion required to move the footrest between positions. Sleeve trough 216 extends in forward and rear directions to provide a secure resting surface for extension arm 214, minimizing rotational play of the footrest member.

Figure 37A:
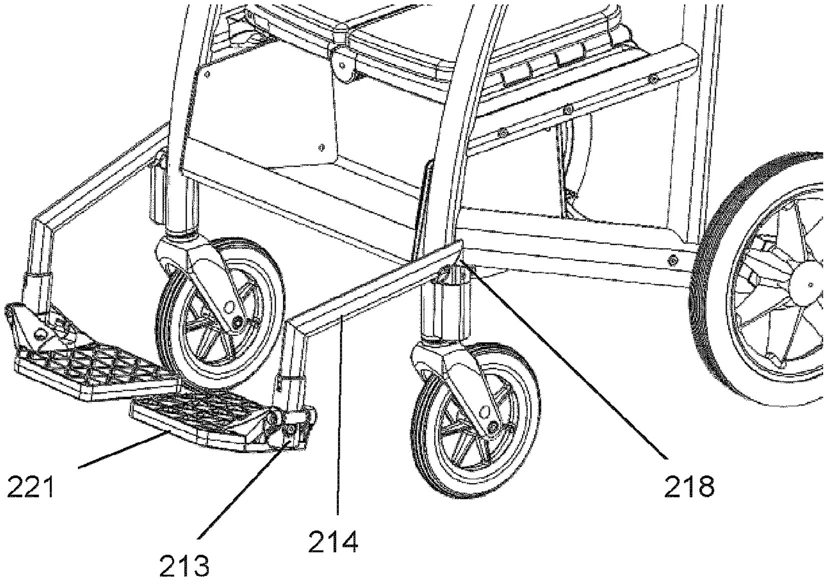
FIG. 37A illustrates a partial perspective view of a footrest member in a use position on a mobility device, in accordance with one embodiment of the invention.
Figure 37B:
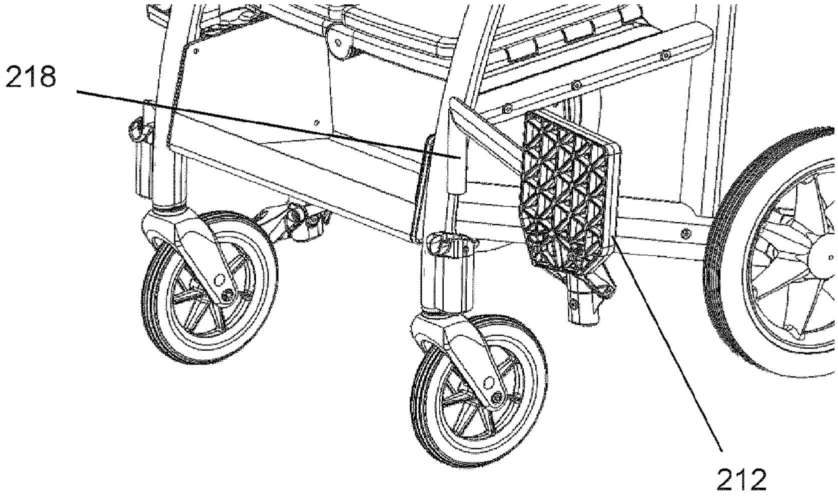
FIG. 37B illustrates a partial perspective view of a footrest member in transition between use and storage positions on a mobility device, in accordance with one embodiment of the invention.
Figure 37C:
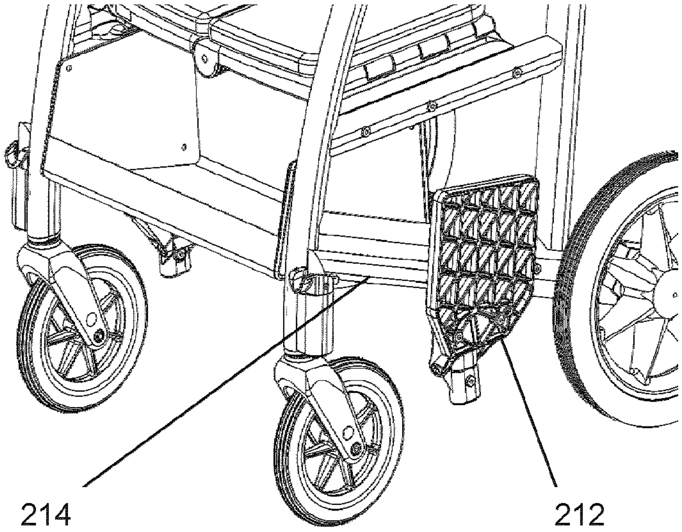
FIG. 37C illustrates a partial perspective view of a footrest member in a storage position on a mobility device, in accordance with one embodiment of the invention.

FIG. 37A depicts a footrest member in the use position, FIG. 37B depicts a footrest member in transition between use and storage positions, and FIG. 37C depicts a footrest member in the storage position.

In the embodiment of FIGS. 37A-C, footrest surface 212 is provided as a generally planar body having a grid-like configuration having openings formed therethrough to avoid build up of dirt and other materials on the surface of the footrest. It is within the scope of the present invention that the footrest may be made of any suitable material, including but not limited to, molded polymer, metal, wood and the like.

In the embodiment shown in FIG. 35B, the footrest member is provided with pivot arm post 218 having pin 226 normal to its cylindrical surface. Pin 226 is adapted to slide through a channel located on the inner surface of sleeve 215, wherein the channel is configured to guide the motion of pin 226 during rotation between storage and use positions. In use, pivot arm 211 is lifted vertically out of a first end position until pin 218 reaches a horizontal portion of the channel, at which point pivot arm 211 is rotated until pin 218 reaches the opposite extent of the horizontal portion. Pivot arm 211 is then dropped vertically until pin 218 reaches a second end position in the channel. FIGS. 36A-B depict first and second end points 236, 237 of the channel.

In another embodiment, between either extremity, the user can further lift up the pivot arm, and access a channel (at an angular position that may be indicated) to remove the footrest member. It is at this point that the footrest member can be reinserted.

In one embodiment, a strap tie down is provided to maintain the footrest in its storage position.

In alternate embodiments, in a configuration that is a rollator only or a transport chair only, it is conceived that each embodiment may also incorporate many of the innovations described herein.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. An assistive mobility device convertible between a rollator mode and a transport chair mode, the device comprising:

two laterally spaced apart side frame structures, each side frame structure comprising:

a rear handle support member having a top handle end and a bottom end, a front armrest member having a top armrest end and a bottom end, a wheel rail member connected to the handle support member, and a seat rail member extending substantially horizontally and connected to at least one of the handle support member and the front armrest member;

a seat bottom extending between the two side frame structures and attached to a respective seat rail member;

a cross brace assembly extending between the two side frame structures;

a seat back member extending between and attached to each of the side frame structures, the seat back member being convertible between a first rollator mode and a second transport chair mode;

a handle assembly located at the top handle end of each handle support member;

two rear wheels, each of the rear wheels being mounted at a rearward end of a respective side frame structure; and two front wheels, each of the front wheels being mounted at a front end of a respective side frame structure, wherein the seat back member is formed of a flexible material and is attached to the side frame structures through a hinge mechanism.

2. The device of claim 1, wherein the hinge mechanism is mounted in an off-vertical orientation.

3. The device of any one of claim 1, the device being further convertible between a deployed state and a collapsed state.

4. The device of claim 3, wherein the seat bottom is convertible between a deployed state and a collapsed state.

5. The device of claim 4, wherein the seat bottom comprises a first seat bottom member hingedly attached to a second seat member, wherein each of the first and second seat members is hingedly attached a frame mount element, each frame mount element being attached to a respective seat rail member.

6. The device of claim 5, wherein the cross brace assembly comprises two cross members, wherein each of the cross members extends between a respective frame mount on one of the side frame structures and the wheel rail member of the other of the side frame structures.

7. The device of claim 6, wherein each cross member comprises a collapsing link hingeably attached at a lower end of a respective cross member, wherein the collapsing link is configured to collapse/fold when the device is in the collapsed state.

8. The device of claim 3, wherein the seat bottom further comprises a locking mechanism to lock the seat bottom in the deployed state.

9. The device of claim 3, wherein the seat bottom further comprises a locking mechanism to lock the seat bottom in the collapsed state.

10. The device of claim 1, wherein the handle assembly is rotatable between a rollator configuration and a transport configuration.

11. The device of claim 1, wherein the handle support member comprises:

a handle receiving tube; and a rotatable and extendible handle extension shaft inserted into the handle receiving tube;

wherein the handle assembly is mounted on the handle extension shaft.

12. The device of claim 11, wherein the handle support member is adjustable in length by extending the handle extension shaft in the handle receiving tube.

13. The device of claim 11, wherein the handle support member further comprises a pivot joint located at a bottom end of the handle extension shaft.

14. The device of claim 13, wherein the pivot joint comprises a top joint and a bottom joint, wherein the top joint is rotatable relative to the bottom joint and the bottom joint remains in a fixed position within the handle receiving tube.

15. The device of claim 1, wherein the device further comprises a braking system comprising a braking mechanism associated with one or both of the rear wheels, a brake lever associated with the handle assembly, and a brake linkage system connecting the braking mechanism and the brake lever.

16. The device of claim 15, wherein the braking mechanism is a disc brake mechanism.

17. The device of claim 15, wherein the braking mechanism is a drum brake mechanism.

18. The device of claim 15, wherein the brake linkage system is a cable extending between the braking mechanism and the brake lever and is located within the handle support member.

19. The device of claim 1, further comprising two footrest members, each of the footrest members being mounted to a respective side frame structure, wherein the footrest member is pivotable between a storage position and a use position.

20. The device of claim 1, wherein each of the front wheels is mounted at the bottom end of a respective front upright member.

21. The device of claim 20, wherein each of the front wheels is pivotably mounted to the front upright member.

22. The device of claim 1, wherein each of the rear wheels is mounted at a rearward end of a respective wheel rail member.

* * * * *